United States Patent
Deguchi et al.

(10) Patent No.: US 11,008,735 B2
(45) Date of Patent: May 18, 2021

(54) IMAGE PICK-UP APPARATUS

(71) Applicant: KOMATSU LTD., Tokyo (JP)

(72) Inventors: Akiyoshi Deguchi, Hirakata (JP); Shun Saito, Hitachinaka (JP); Hiroyoshi Yamaguchi, Hiratsuka (JP); Shun Kawamoto, Hiratsuka (JP); Taiki Sugawara, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/557,496

(22) PCT Filed: Sep. 30, 2015

(86) PCT No.: PCT/JP2015/077839
§ 371 (c)(1),
(2) Date: Sep. 12, 2017

(87) PCT Pub. No.: WO2017/056266
PCT Pub. Date: Apr. 6, 2017

(65) Prior Publication Data
US 2018/0058044 A1 Mar. 1, 2018

(51) Int. Cl.
*E02F 9/26* (2006.01)
*B60R 1/00* (2006.01)
*H04N 13/239* (2018.01)
*H04N 7/18* (2006.01)
*E02F 3/32* (2006.01)

(52) U.S. Cl.
CPC .............. *E02F 9/261* (2013.01); *B60R 1/00* (2013.01); *H04N 7/18* (2013.01); *H04N 7/181* (2013.01); *H04N 13/239* (2018.05); *B60R 2300/105* (2013.01); *B60R 2300/107* (2013.01); *E02F 3/32* (2013.01)

(58) Field of Classification Search
USPC ........................................................... 348/47
See application file for complete search history.

(56) References Cited

U.S. PATENT DOCUMENTS 6,911,997 B1 * 6/2005 Okamoto .................. B60R 1/00
348/148
9,903,099 B2 * 2/2018 Chang ..................... E02F 9/264
(Continued)

FOREIGN PATENT DOCUMENTS

CN 103362172 A 10/2013
JP 11083530 A * 3/1999
(Continued)

OTHER PUBLICATIONS

English Translation of Japanese Publication JP 2012-233353 Nov. 2012.*

(Continued)

*Primary Examiner* — Loi H Tran
(74) *Attorney, Agent, or Firm* — Faegre Drinker Biddle & Reath LLP

(57) ABSTRACT

An image pick-up apparatus includes a first stereo camera attached to a revolving unit and a second stereo camera attached to the revolving unit. The first stereo camera picks up an image of a first image pick-up range. The second stereo camera picks up an image of a second image pick-up range above or beyond the first image pick-up range.

6 Claims, 21 Drawing Sheets

(56) References Cited

U.S. PATENT DOCUMENTS

| | | | |
|---|---|---|---|
| 2002/0167726 A1* | 11/2002 | Barman | G01B 11/00 |
| | | | 359/458 |
| 2013/0094705 A1* | 4/2013 | Tyagi | G06K 9/00369 |
| | | | 382/103 |
| 2013/0158947 A1* | 6/2013 | Suzuki | G01B 11/00 |
| | | | 702/155 |
| 2013/0261903 A1 | 10/2013 | Hargrave, Jr. et al. | |
| 2014/0375794 A1* | 12/2014 | Singh | B01J 19/121 |
| | | | 348/95 |
| 2016/0335489 A1 | 11/2016 | Shigemura | |
| 2017/0028922 A1* | 2/2017 | Matsuo | B60R 1/002 |

FOREIGN PATENT DOCUMENTS

| | | | |
|---|---|---|---|
| JP | H11-83530 A | | 3/1999 |
| JP | 2006-214735 A | | 8/2006 |
| JP | 2010-109452 A | | 5/2010 |
| JP | 2012-233353 A | | 11/2012 |
| JP | 2012233353 A | * | 11/2012 |
| JP | 2013-2101 A | | 1/2013 |
| JP | 2013002101 A | * | 1/2013 |
| JP | 2013-36243 A | | 2/2013 |
| JP | 2014-215039 A | | 11/2014 |
| JP | 2015-132969 A | | 7/2015 |

OTHER PUBLICATIONS

English Translation of Japanese Publication JP 2013-002101 Jan. 2013.*

English Translation of Japanese Publication JP 11-83530 Mar. 1999.*

Office Action dated May 15, 2019 in U.S. Appl. No. 15/560,177 with a Double Patenting Rejection on pp. 4 and 5.

* cited by examiner

IMAGE PICK-UP APPARATUS

TECHNICAL FIELD

The present invention relates to an image pick-up apparatus.

BACKGROUND ART

During work by a work vehicle, existing topography varies with progress of the work. Therefore, existing topography data should be obtained in parallel to progress of the work. Measurement of a distance by a stereo camera is available as one of means for obtaining existing topography data.

An earth-moving machine including a stereo camera having a first image pick-up portion and a second image pick-up portion and image pick-up direction changing means capable of changing a direction of image pick-up by the stereo camera has conventionally been proposed (see, for example, Japanese Patent Laying-Open No. 2013-36243 (PTD 1)). In addition, an earth-moving machine obtaining a stereo image from a plurality of stereo cameras attached to a vehicular body has been proposed (see, for example, Japanese Patent Laying-Open No. 2014-215039 (PTD 2)).

CITATION LIST

Patent Document

PTD 1: Japanese Patent Laying-Open No. 2013-36243
PTD 2: Japanese Patent Laying-Open No. 2014-215039

SUMMARY OF INVENTION

Technical Problem

Since it is ground that is worked by a work implement of a work vehicle, a stereo camera mounted on the work vehicle is disposed such that an optical axis thereof is at an angle of depression. A contour of an object to be worked is not limited to flat ground, but the ground may be inclined upward from a current position of the work vehicle. In such a case, a stereo camera of which optical axis is at an angle of depression cannot cover the entire inclined topography in an image pick-up range and image pick-up data on existing topography of an object to be worked cannot sufficiently be obtained.

PTD 1 discloses a technique allowing image pick-up over a wide range by changing a direction of image pick-up by a stereo camera by moving the stereo camera. When the stereo camera is moved, however, there will be time lag between image pick-up data before and after movement. Therefore, it is difficult to accurately know existing topography to be worked.

An object of the present invention is to provide an image pick-up apparatus capable of accurately picking up an image of existing topography to be worked over a wide range.

Solution to Problem

An image pick-up apparatus according to the present invention is provided in a work vehicle. The work vehicle has a vehicular main body. The image pick-up apparatus includes a first stereo camera attached to the vehicular main body and a second stereo camera attached to the vehicular main body. The first stereo camera picks up an image of a first image pick-up range. The second stereo camera picks up an image of a second image pick-up range above or beyond the first image pick-up range.

In the image pick-up apparatus, the first image pick-up range of the first stereo camera overlaps with the second image pick-up range of the second stereo camera.

In the image pick-up apparatus, the work vehicle further has a work implement attached to the vehicular main body. The work implement has a central axis in a plan view. An optical axis of the first stereo camera and an optical axis of the second stereo camera are inclined with respect to the central axis in a plan view toward the work implement as a distance from the vehicular main body is greater.

In the image pick-up apparatus, an optical axis of the first stereo camera and an optical axis of the second stereo camera form a downward angle from a horizontal direction, in front of the vehicular main body.

In the image pick-up apparatus, the first stereo camera and the second stereo camera are arranged as being aligned in a lateral direction of the vehicular main body.

In the image pick-up apparatus, the first stereo camera is arranged as high as the second stereo camera in an upward/downward direction.

In the image pick-up apparatus, the first stereo camera has a first image pick-up portion and a second image pick-up portion arranged on a right side of the first image pick-up portion in a lateral direction of the vehicular main body. The second stereo camera has a third image pick-up portion and a fourth image pick-up portion arranged on a right side of the third image pick-up portion in the lateral direction of the vehicular main body. The first image pick-up portion and the third image pick-up portion constitute a left image pick-up portion group. The second image pick-up portion and the fourth image pick-up portion constitute a right image pick-up portion group. The left image pick-up portion group and the right image pick-up portion group are arranged at a distance from each other in the lateral direction of the vehicular main body.

In the image pick-up apparatus, the first stereo camera and the second stereo camera are configured to be able to pick up a vertically long image.

In the image pick-up apparatus, the vehicular main body has a cab. The image pick-up apparatus is attached to the cab.

Advantageous Effects of Invention

According to the present invention, an image of existing topography to be worked can accurately be picked up over a wide range.

DESCRIPTION OF EMBODIMENTS

An embodiment of the present invention will be described hereinafter with reference to the drawings.

A construction of a hydraulic excavator in one embodiment of the present invention will initially be described.

Figure 1:
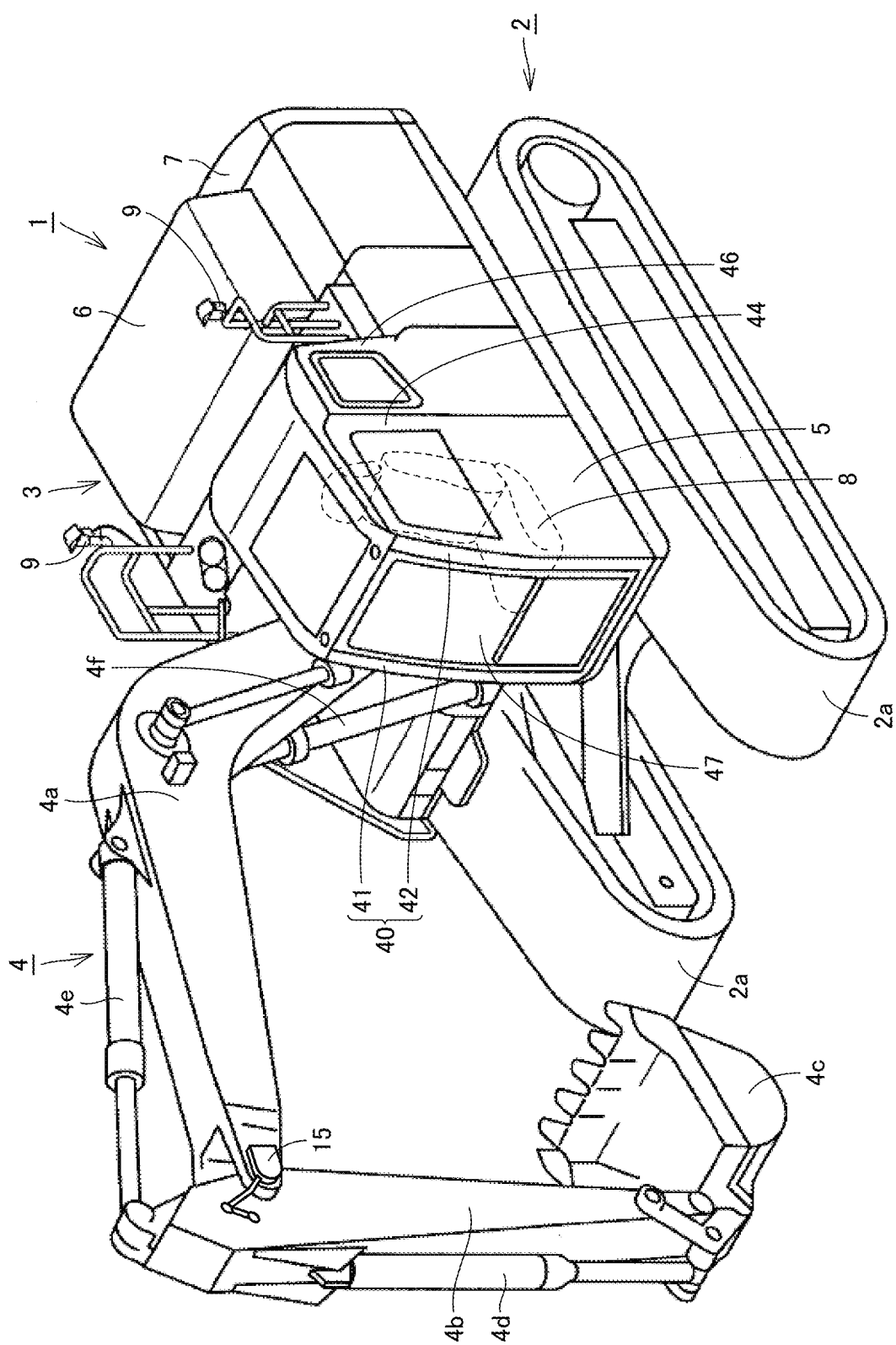
FIG. 1 is a perspective view schematically showing a construction of a hydraulic excavator in one embodiment of the present invention.

FIG. 1 is a perspective view schematically showing a construction of a hydraulic excavator 1 in one embodiment of the present invention. As shown in FIG. 1, hydraulic excavator 1 in the present embodiment mainly has a travel unit 2, a revolving unit 3, and a work implement 4. A vehicular main body of hydraulic excavator 1 is constituted of travel unit 2 and revolving unit 3.

Travel unit 2 has a pair of left and right crawler belts 2a. Hydraulic excavator 1 is constructed to be self-propelled as the pair of left and right crawler belts 2a is rotationally driven.

Revolving unit 3 is revolvably attached to travel unit 2. Revolving unit 3 mainly has a cab 5, an engine hood 6, and a counterweight 7.

Cab 5 is arranged on a front left side of revolving unit 3 (a front side of the vehicle). An operator's compartment is formed inside cab 5. The operator's compartment is a space for an operator to operate hydraulic excavator 1. An operator's seat 8 for an operator to have a seat is arranged in the operator's compartment. An antenna 9 is provided on an upper surface of revolving unit 3.

In the present embodiment, positional relation among components will be described with work implement 4 being defined as the reference.

A boom 4a of work implement 4 rotationally moves around a boom pin with respect to revolving unit 3. A trajectory of movement of a specific portion of boom 4a which pivots with respect to revolving unit 3, such as a tip end portion of boom 4a, is in an arc shape, and a plane including the arc is specified. When hydraulic excavator 1 is planarly viewed, the plane is shown as a straight line. A direction in which this straight line extends is a fore/aft direction of the vehicular main body of the work vehicle or a fore/aft direction of revolving unit 3, and it is also simply referred to as the fore/aft direction below. A lateral direction (a direction of vehicle width) of the vehicular main body or a lateral direction of revolving unit 3 is a direction orthogonal to the fore/aft direction in a plan view and also simply referred to as the lateral direction below. The lateral direction refers to a direction of extension of the boom pin. An upward/downward direction of the vehicular main body or an upward/downward direction of revolving unit 3 is a direction orthogonal to the plane defined by the fore/aft direction and the lateral direction and also simply referred to as the upward/downward direction below.

A side in the fore/aft direction where work implement 4 projects from the vehicular main body is defined as the fore direction, and a direction opposite to the fore direction is defined as the aft direction. A right side and a left side in the lateral direction when one faces the fore direction are defined as a right direction and a left direction, respectively. A side in the upward/downward direction where the ground is located is defined as a lower side and a side where the sky is located is defined as an upper side.

The fore/aft direction refers to a fore/aft direction of an operator who sits at operator's seat 8 in cab 5. The lateral direction refers to a lateral direction of the operator who sits at operator's seat 8. The upward/downward direction refers to an upward/downward direction of the operator who sits at operator's seat 8. A direction in which the operator sitting at operator's seat 8 faces is defined as the fore direction and a direction behind the operator sitting at operator's seat 8 is defined as the aft direction. A right side and a left side at the time when the operator sitting at operator's seat 8 faces front are defined as the right direction and the left direction, respectively. A foot side of the operator who sits at operator's seat 8 is defined as a lower side, and a head side is defined as an upper side.

Engine hood 6 and counterweight 7 are arranged on a rear side of revolving unit 3 (a rear side of the vehicle). Engine hood 6 is arranged to cover at least an engine compartment from above. An engine unit (such as an engine and an exhaust gas treatment unit) is accommodated in the engine compartment. Counterweight 7 is arranged in the rear of the engine compartment for keeping balance of the vehicular main body during excavation or the like.

Work implement 4 serves for such work as excavation of soil. Work implement 4 is attached on the front side of revolving unit 3. Work implement 4 has, for example, boom 4a, an arm 4b, a bucket 4c, and hydraulic cylinders 4d, 4e, and 4f. Work implement 4 can be driven as boom 4a, arm 4b, and bucket 4c are driven by respective hydraulic cylinders 4f, 4e, and 4d.

A base end portion of boom 4a is coupled to revolving unit 3 with the boom pin being interposed. Boom 4a is provided as being rotatable around the boom pin. A base end portion of arm 4b is coupled to a tip end portion of boom 4a with an arm pin being interposed. Arm 4b is provided as being rotatable around the arm pin. Bucket 4c is coupled to a tip end portion of arm 4b with a bucket pin being interposed. Bucket 4c is provided as being rotatable around the bucket pin.

Work implement 4 is provided on the right of cab 5. Arrangement of cab 5 and work implement 4 is not limited to the example shown in FIG. 1, and for example, work implement 4 may be provided on the left of cab 5 arranged on a front right side of revolving unit 3.

A rotary encoder 15 is attached to boom 4a. Rotary encoder 15 outputs a pulse signal corresponding to an angle of pivot of arm 4b with respect to boom 4a. A rotary encoder is attached also to the vehicular main body. The rotary encoder attached to the vehicular main body outputs a pulse signal corresponding to an angle of pivot of boom 4a with respect to the vehicular main body.

Cab 5 includes a roof portion arranged to cover operator's seat 8 and a plurality of pillars supporting the roof portion. The plurality of pillars have a front pillar 40, a rear pillar 46, and an intermediate pillar 44. Front pillar 40 is arranged in a corner portion of cab 5 in front of operator's seat 8. Rear pillar 46 is arranged in a corner portion of cab 5 in the rear of operator's seat 8. Intermediate pillar 44 is arranged between front pillar 40 and rear pillar 46. Each pillar has a lower end coupled to a floor portion of cab 5 and an upper end coupled to the roof portion of cab 5.

Front pillar 40 has a right pillar 41 and a left pillar 42. Right pillar 41 is arranged at the front right corner of cab 5. Left pillar 42 is arranged at the front left corner of cab 5. Work implement 4 is arranged on the right of cab 5. Right pillar 41 is arranged on a side close to work implement 4. Left pillar 42 is arranged on a side distant from work implement 4.

A space surrounded by right pillar 41, left pillar 42, and a pair of rear pillars 46 provides an indoor space in cab 5. Operator's seat 8 is accommodated in the indoor space in cab 5. Operator's seat 8 is arranged substantially in a central portion on the floor portion of cab 5. A door for an operator to enter and exit from cab 5 is provided in a left side surface of cab 5.

A front window 47 is arranged between right pillar 41 and left pillar 42. Front window 47 is arranged in front of operator's seat 8. Front window 47 is formed of a transparent material. An operator seated at operator's seat 8 can visually recognize the outside of cab 5 through front window 47. For example, the operator seated at operator's seat 8 can directly look at bucket 4c excavating soil and existing topography to be executed through front window 47.

Figure 2:
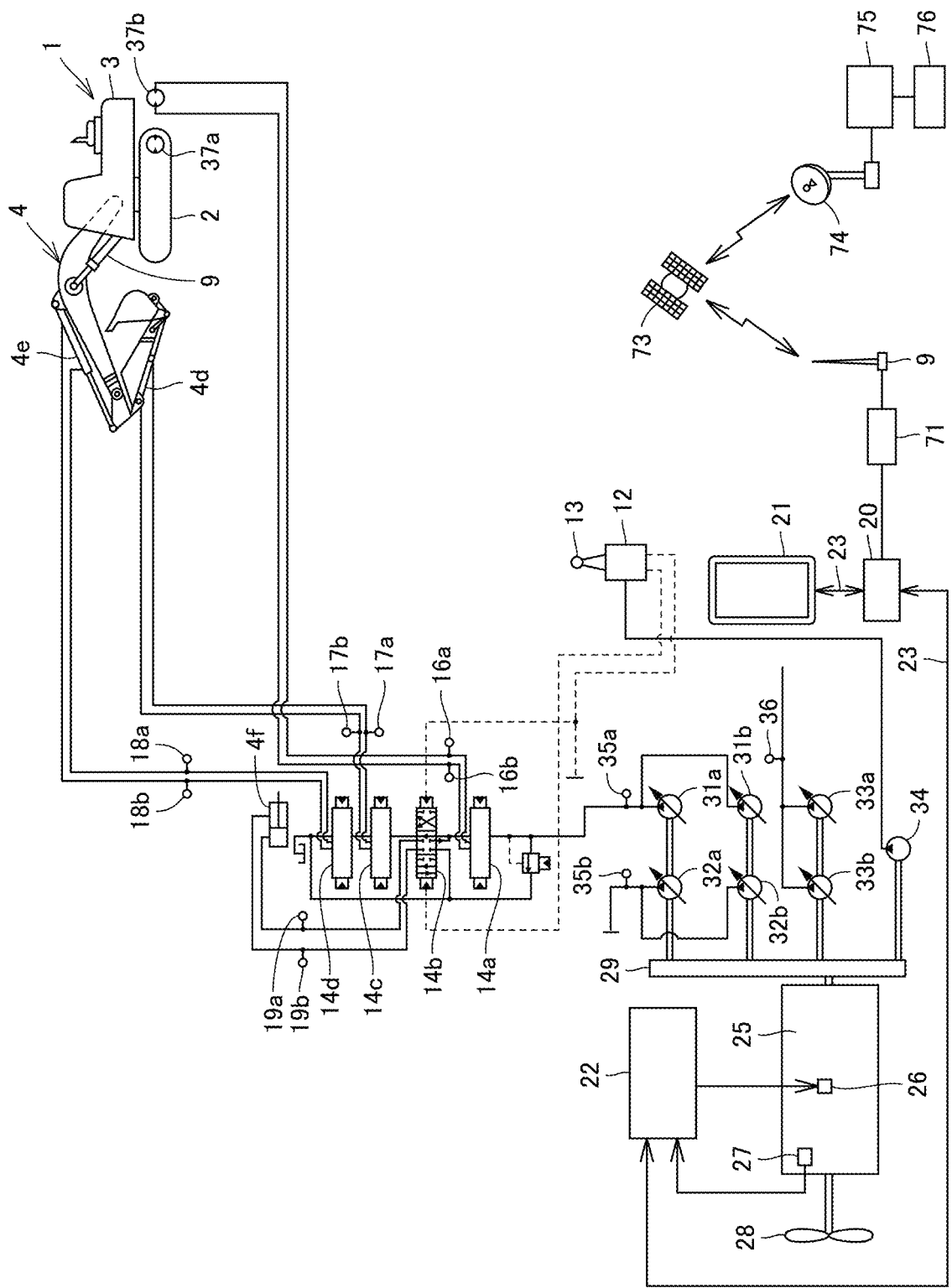
FIG. 2 is a diagram of a hydraulic circuit applied to the hydraulic excavator shown in FIG. 1.

FIG. 2 is a diagram of a hydraulic circuit applied to hydraulic excavator 1 shown in FIG. 1. An engine 25 is mounted in the engine compartment on a rear side of revolving unit 3. As shown in FIG. 2, a power take off (abbreviated as PTO) apparatus 29 is attached to engine 25. A plurality of hydraulic pumps 31a, 31b, 32a, 32b, 33a, 33b, and 34 are coupled to the PTO apparatus.

Hydraulic pump 34 supplies a pilot pressure to a pilot valve 12 operated through an operation lever 13. Other hydraulic pumps 31a to 33b supply a pressurized oil to each actuator such as hydraulic cylinders 4d, 4e, and 4f driving work implement 4, a swing motor revolvably driving revolving unit 3, and left and right travel motors 37a and 37b provided in travel unit 2.

The pressurized oil delivered from hydraulic pumps 31a and 31b is supplied to right travel motor 37b, boom cylinder 4f, arm cylinder 4e, and bucket cylinder 4d through a right travel motor directional valve 14a, a boom directional valve 14b, a bucket directional valve 14c, and an arm directional valve 14d. A pilot pressure corresponding to each pilot operation portion is supplied from pilot valve 12 to pilot operation portions of directional valves 14a to 14d.

Pressure sensors 35a and 35b detecting a pump delivery pressure are provided in discharge tube passages of hydraulic pumps 31a and 31b and hydraulic pumps 32a and 32b, respectively. A pressure sensor 36 detecting a pump delivery pressure is provided in a discharge tube passage of hydraulic pumps 33a and 33b.

Pressure sensors 16a, 16b, 17a, 17b, 18a, 18b, 19a, and 19b each detecting a load pressure of an actuator are provided in tube passages connecting directional valves 14a to 14d to actuators. Similarly to the above, a pressure sensor (not shown) detecting a load pressure is provided in a connection tube passage for each of the swing motor and left travel motor 37a.

A detection signal from the pressure sensor is input to controller 20. Controller 20 finds a load frequency (which is a frequency of occurrence for each load level and corresponds to an amount of load) of the work implement or a travel driving portion for travel unit 2, based on a load pressure detection value of each actuator from the pressure sensor.

A fuel injection amount command is input from an engine controller 22 to a fuel injection pump 26 of engine 25. A detection signal from an engine speed sensor 27 provided in an output rotation shaft of engine 25 is input to engine controller 22 as a feedback signal. Engine controller 22 calculates a fuel injection amount command and outputs the command so as to drive engine 25 at prescribed horsepower based on a feedback signal for the engine speed, and inputs the engine speed and an output fuel injection amount command value to controller 20.

Controller 20, engine controller 22, and a monitor 21 are connected to one another through a bidirectional communication cable 23, and form a communication network in hydraulic excavator 1. Monitor 21, controller 20, and engine controller 22 can transmit and receive information to and from one another through network communication cables 23 and 23. Monitor 21, controller 20, and engine controller 22 are implemented mainly by a computer device such as a microcomputer.

Information can be transmitted and received between controller 20 and an external supervisory station 76. Controller 20 and supervisory station 76 communicate with each other through satellite communication. A communication terminal 71 is connected to controller 20. Antennae 9 mounted on revolving unit 3 shown in FIG. 1 are connected to communication terminal 71.

A communication earth station 74 communicates with a communication satellite 73 through a dedicated communication line. A network control station 75 is connected to communication earth station 74 through a dedicated line. Supervisory station 76 on earth is connected to network control station 75 through the Internet or the like. Thus, data is transmitted and received between controller 20 and prescribed supervisory station 76 through communication terminal 71, communication satellite 73, communication earth station 74, and network control station 75.

Execution design data created in three-dimensional computer aided design (CAD) is saved in advance in controller 20. Monitor 21 is arranged in cab 5. Monitor 21 can update and show in real time on a screen a current position of hydraulic excavator 1 and existing topography to be executed so that an operator can always check a state of work by hydraulic excavator 1.

Controller 20 compares execution design data, a position and an attitude of work implement 4, and existing topography in real time. Controller 20 controls work implement 4 by driving the hydraulic circuit based on a result of comparison. More specifically, a position of bucket 4c is fitted to a position of execution in accordance with execution design data, and thereafter prescribed execution such as excavation or land grading is performed. Thus, since work implement 4 of hydraulic excavator 1 is automatically controlled based on the execution design data, efficiency and accuracy in execution can be improved and construction and execution of high quality can readily be performed.

Figure 3:
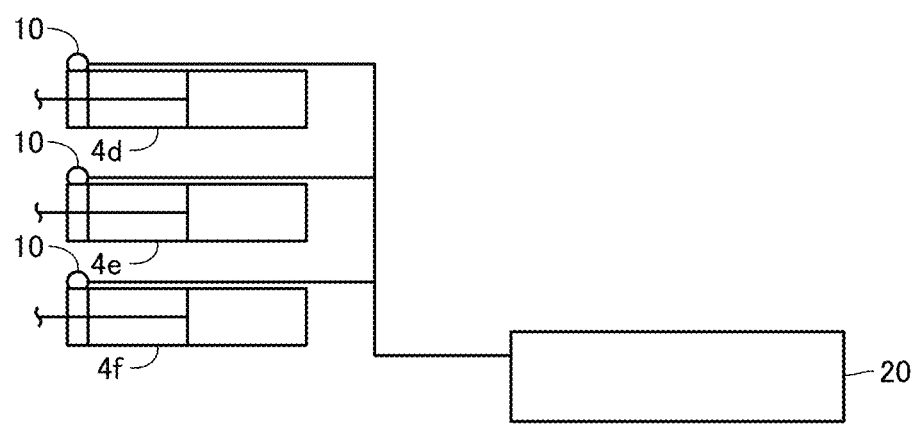
FIG. 3 is a diagram schematically showing relation among a hydraulic cylinder, a position sensor, and a controller of the hydraulic excavator shown in FIG. 1.

FIG. 3 is a diagram schematically showing relation among a hydraulic cylinder, a position sensor 10, and controller 20 of hydraulic excavator 1 shown in FIG. 1. As shown in FIG. 3, position sensor 10 detecting an amount of stroke of a hydraulic cylinder as an amount of rotation is attached to each hydraulic cylinder (bucket cylinder 4d, arm cylinder 4e, and boom cylinder 4f).

Position sensor 10 is electrically connected to controller 20. Controller 20 measures a stroke length of each of bucket cylinder 4d, arm cylinder 4e, and boom cylinder 4f based on a detection signal from position sensor 10.

The hydraulic cylinder has a cylinder tube and a cylinder rod movable relatively to the cylinder tube. Position sensor 10 has a rotary roller rotating with a linear motion of the cylinder rod. Position sensor 10 measures an amount of displacement (a stroke length) of the cylinder rod with respect to the cylinder tube based on a rotation speed and the number of revolutions of the rotary roller.

Figure 4:
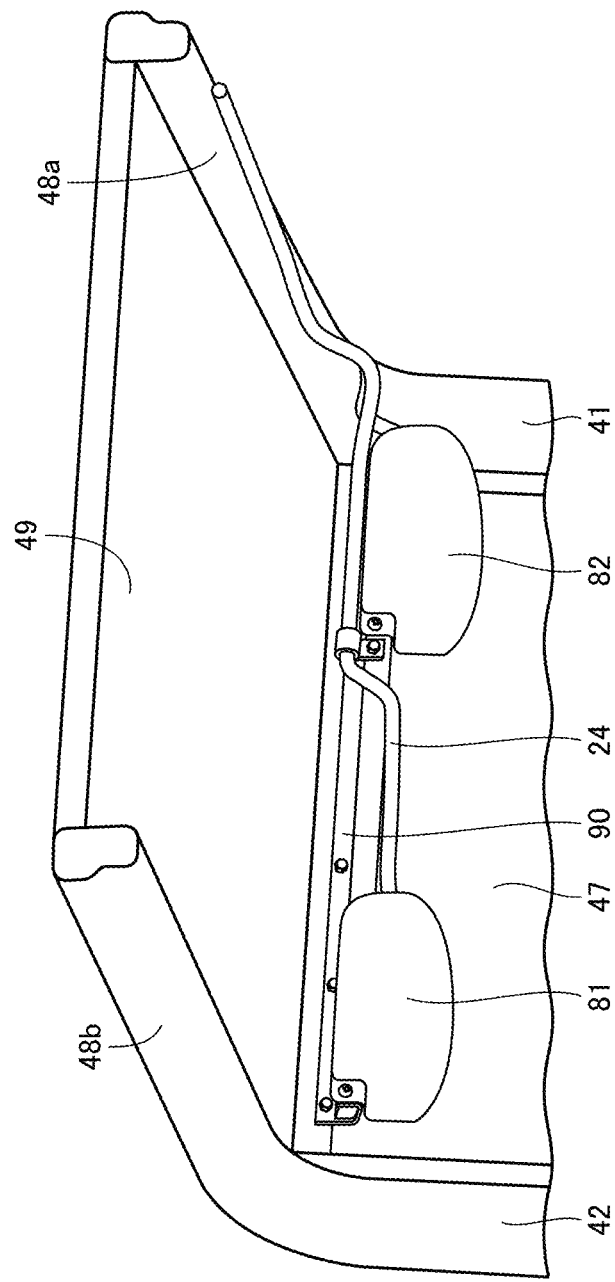
FIG. 4 is a perspective view showing a state that an upper front edge portion in a cab is viewed from the rear.

FIG. 4 is a perspective view showing a state that an upper front edge portion in cab 5 is viewed from the rear. An upper portion of right pillar 41 is continuous to a right roof beam 48a. An upper portion of left pillar 42 is continuous to a left roof beam 48b. Right roof beam 48a bridges the upper portion of right pillar 41 and an upper portion of right rear pillar 46. Left roof beam 48b bridges the upper portion of left pillar 42 and an upper portion of left rear pillar 46. A roof panel 49 is attached between right roof beam 48a and left roof beam 48b. Roof panel 49 forms the roof portion of cab 5.

A base portion 90 is arranged along an upper edge of front window 47. Base portion 90 is attached to an upper frame portion of front window 47 as will be described later in detail. Base portion 90 extends in the lateral direction between right pillar 41 and left pillar 42. Base portion 90 is arranged along a front edge of roof panel 49.

A left case 81 is attached to base portion 90 in the vicinity of left pillar 42. A right case 82 is attached to base portion 90 in the vicinity of right pillar 41. Left case 81 and right case 82 are hollow. Left case 81 and right case 82 are arranged to project rearward from base portion 90.

A cable 24 is arranged along a direction in which base portion 90 extends. Cable 24 extends in the lateral direction along the upper edge of front window 47 and extends in the fore/aft direction along right roof beam 48a. Cable 24 is connected to an internal space in left case 81 and to an internal space in right case 82. Cable 24 is supported by base portion 90 with a support 98 (FIG. 6) being interposed.

Figure 5:
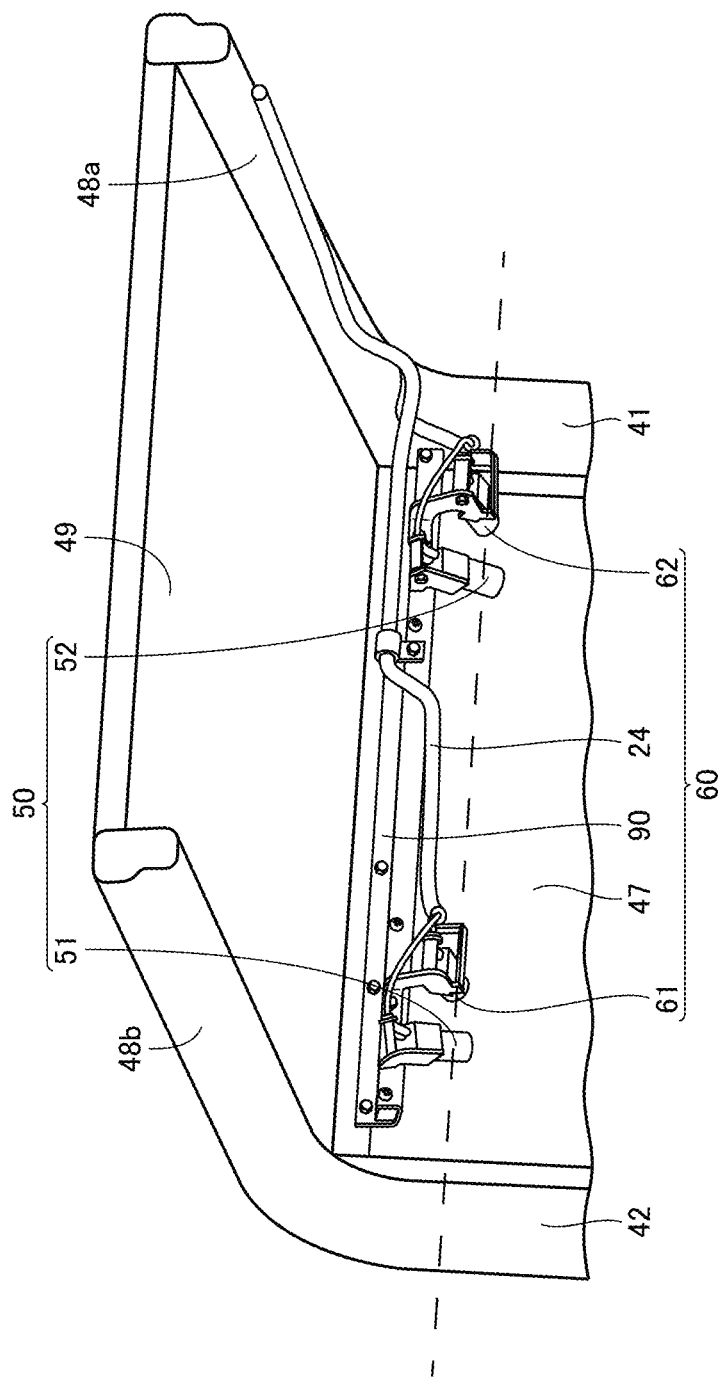
FIG. 5 is a perspective view showing a state that the upper front edge portion in the cab is viewed from the rear.

FIG. 5 is a perspective view showing a state that the upper front edge portion in cab 5 is viewed from the rear similarly to FIG. 4. FIG. 5 shows a state that left case 81 and right case 82 shown in FIG. 4 have been removed from base portion 90. Since left case 81 and right case 82 have been removed from base portion 90, a first image pick-up portion 51 and a third image pick-up portion 61 accommodated in left case 81 and a second image pick-up portion 52 and a fourth image pick-up portion 62 accommodated in right case 82 are shown in FIG. 5.

First image pick-up portion 51 and second image pick-up portion 52 are in synchronization with each other and implement a first stereo camera 50. First stereo camera 50 includes first image pick-up portion 51 and second image pick-up portion 52. First stereo camera 50 is an image pick-up apparatus for picking up an image of a front region in front of the vehicular main body. First stereo camera 50 can pick up an image, for example, of a work region where work implement 4 performs work. First image pick-up portion 51 is arranged on the left of second image pick-up portion 52 in the lateral direction. Second image pick-up portion 52 is arranged on the right of first image pick-up portion 51 in the lateral direction.

Third image pick-up portion 61 and fourth image pick-up portion 62 are in synchronization with each other and implement a second stereo camera 60. Second stereo camera 60 includes third image pick-up portion 61 and fourth image pick-up portion 62. Second stereo camera 60 is an image pick-up apparatus for picking up an image of the front region in front of the vehicular main body. Second stereo camera 60 can pick up an image, for example, of the work region where work implement 4 performs work. Third image pick-up portion 61 is arranged on the left of fourth image pick-up portion 62 in the lateral direction. Fourth image pick-up portion 62 is arranged on the right of third image pick-up portion 61 in the lateral direction.

First stereo camera 50 and second stereo camera 60 are arranged as being aligned in the lateral direction. First image pick-up portion 51, second image pick-up portion 52, third image pick-up portion 61, and fourth image pick-up portion 62 are arranged as being aligned in the lateral direction. First image pick-up portion 51, third image pick-up portion 61, second image pick-up portion 52, and fourth image pick-up portion 62 are arranged sequentially from the left to the right in the lateral direction. First image pick-up portion 51, second image pick-up portion 52, third image pick-up portion 61, and fourth image pick-up portion 62 are implemented by identical apparatuses.

An interval between third image pick-up portion 61 and second image pick-up portion 52 in the lateral direction is greater than an interval between first image pick-up portion 51 and third image pick-up portion 61 in the lateral direction. The interval between third image pick-up portion 61 and second image pick-up portion 52 in the lateral direction is greater than an interval between second image pick-up portion 52 and fourth image pick-up portion 62 in the lateral direction. An interval between first image pick-up portion 51 and second image pick-up portion 52 in the lateral direction is equal to an interval between third image pick-up portion 61 and fourth image pick-up portion 62 in the lateral direction.

First stereo camera 50 and second stereo camera 60 are arranged in cab 5 along the upper edge of front window 47. First image pick-up portion 51, second image pick-up portion 52, third image pick-up portion 61, and fourth image pick-up portion 62 are arranged in cab 5 along the upper edge of front window 47. First image pick-up portion 51, second image pick-up portion 52, third image pick-up portion 61, and fourth image pick-up portion 62 are arranged to face front window 47.

First stereo camera 50 and second stereo camera 60 are arranged at the same positions in the upward/downward direction as being aligned on a dashed line extending in the lateral direction and shown in FIG. 5. First image pick-up portion 51 and second image pick-up portion 52 of first stereo camera 50 are arranged at the same height. Third image pick-up portion 61 and fourth image pick-up portion 62 of second stereo camera 60 are arranged at the same height. First image pick-up portion 51, second image pick-up portion 52, third image pick-up portion 61, and fourth image pick-up portion 62 are arranged at the same positions in the upward/downward direction as being aligned on the dashed line shown in FIG. 5.

First image pick-up portion 51 and third image pick-up portion 61 constitute a left image pick-up portion group. Second image pick-up portion 52 and fourth image pick-up portion 62 constitute a right image pick-up portion group. The left image pick-up portion group is accommodated in left case 81 shown in FIG. 4. The right image pick-up portion group is accommodated in right case 82 shown in FIG. 4. The left image pick-up portion group and the right image pick-up portion group are arranged at a distance from each other in the lateral direction.

The left image pick-up portion group is arranged in the vicinity of left pillar 42. A distance between the center of cab 5 and the left image pick-up portion group in the lateral direction is greater than a distance between left pillar 42 and the left image pick-up portion group. The left image pick-up portion group is arranged as being closer to left pillar 42 than to the center of cab 5 in the lateral direction. When a region between the center of cab 5 and left pillar 42 in the lateral direction is virtually divided into two sections in the lateral direction, the left image pick-up portion group is arranged in a region close to left pillar 42 of the two divided regions. The left image pick-up portion group is arranged as being near left pillar 42.

The right image pick-up portion group is arranged in the vicinity of right pillar 41. A distance between the center of cab 5 and the right image pick-up portion group in the lateral direction is greater than a distance between right pillar 41 and the right image pick-up portion group. The right image pick-up portion group is arranged as being closer to right pillar 41 than to the center of cab 5 in the lateral direction. When a region between the center of cab 5 and right pillar 41 in the lateral direction is virtually divided into two sections in the lateral direction, the right image pick-up portion group is arranged in a region closer to right pillar 41 of the two divided regions. The right image pick-up portion group is arranged as being near right pillar 41.

Each image pick-up portion includes an optical processing unit, a light reception processing unit, and an image processing unit. The optical processing unit has a lens for condensing light. An optical axis of the image pick-up portion which will be described later refers to an axis which passes through the center of a lens surface and is perpendicular to the lens surface. The light reception processing unit has an image pick-up element. The image pick-up element is implemented, for example, by a CMOS. The image pick-up element has a light reception surface. The light reception surface is a surface orthogonal to the optical axis. The light reception surface is flat and rectangular and arranged as being vertically long. The image pick-up portion is arranged such that a long side (a longitudinal side) of the light reception surface of the image pick-up element extends along a vertical direction.

Figure 6:
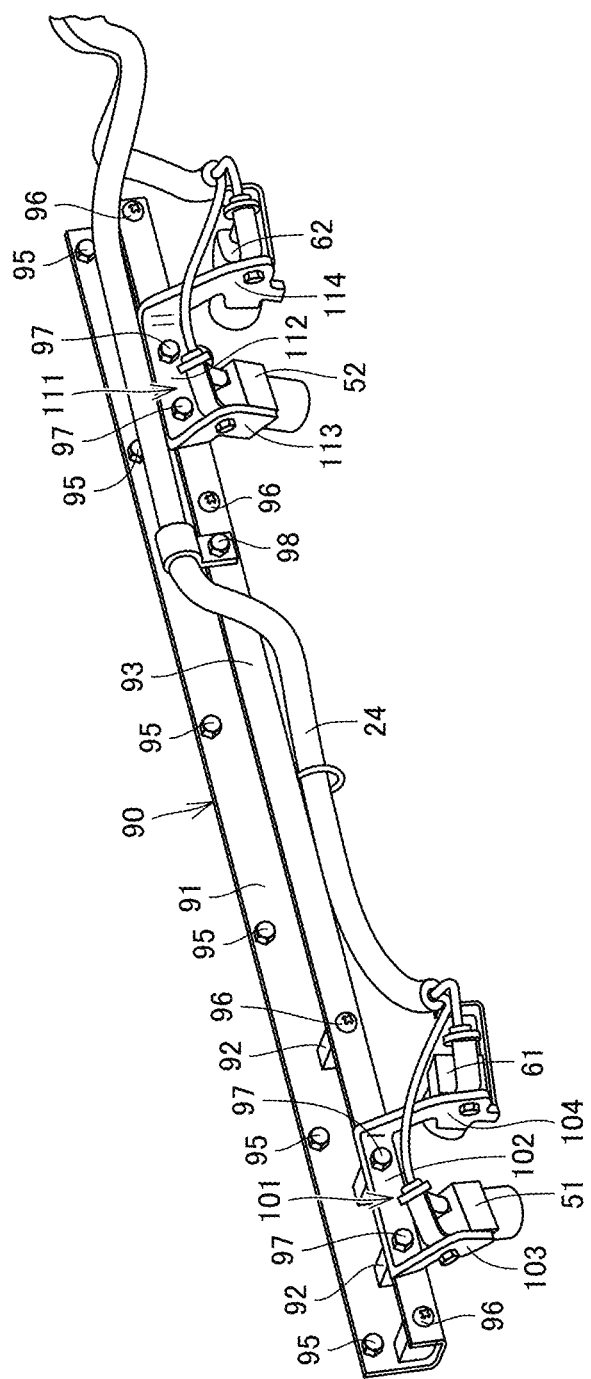
FIG. 6 is a perspective view showing a condition of attachment of a stereo camera to a base portion.

FIG. 6 is a perspective view showing a condition of attachment of first stereo camera 50 and second stereo camera 60 to base portion 90. Referring also to FIG. 5, the right side in FIG. 6 corresponds to the right direction of the vehicular main body, and the left side in FIG. 6 corresponds to the left direction of the vehicular main body. As shown in FIG. 6, base portion 90 has an attachment angle bar 91 attached to the upper frame portion of front window 47. Attachment angle bar 91 is in a shape of angle steel and has two sides bent substantially at a right angle with respect to each other.

A plurality of through holes which pass through one side in a direction of thickness are provided in the one side of attachment angle bar 91. A bolt 95 passes through each of these through holes and is fastened to the upper frame portion of front window 47 so that attachment angle bar 91 is attached to front window 47.

An attachment piece 92 is fixed to the other side of attachment angle bar 91. Attachment piece 92 has an outer geometry in a shape of a rectangular box. One surface of outer surfaces of attachment piece 92 is in contact with the one side of attachment angle bar 91 and another surface is in contact with the other side of attachment angle bar 91. A nut hole is provided in attachment piece 92.

An attachment plate 93 is provided in the other side of attachment angle bar 91. Base portion 90 includes attachment angle bar 91, attachment piece 92, and attachment plate 93. Attachment plate 93 is in a shape of an elongated flat plate. Attachment plate 93 extends in parallel to a direction of extension of attachment angle bar 91. Attachment plate 93 extends in a direction orthogonal to the other side of attachment angle bar 91 and in parallel to the one side of attachment angle bar 91. Attachment angle bar 91 and attachment plate 93 are integrated with each other and form a shape similar to a Greek uppercase character pi.

A plurality of through holes which pass through attachment plate 93 in a direction of thickness are provided in attachment plate 93. A bolt 96 passes through each of some of the plurality of through holes and is fastened to the nut hole provided in attachment piece 92 so that attachment plate 93 is fixed to attachment angle bar 91 with attachment piece 92 being interposed. An edge portion of attachment plate 93 may directly be fixed to the other side of attachment angle bar 91.

A bracket 101 is attached to attachment plate 93. A bolt 97 passes through each of a through hole provided in bracket 101 and the through hole provided in attachment plate 93 and is fastened to the nut hole provided in attachment piece 92, so that bracket 101 is fixed to attachment plate 93. Bracket 101 is fixed to attachment angle bar 91 with attachment plate 93 and attachment piece 92 being interposed.

Bracket 101 is in a shape of an angular C. Bracket 101 may be formed by bending opposing end portions of one elongated flat plate. Bracket 101 has a fixed portion 102 forming a central portion of bracket 101, a projection portion 103 forming one end of bracket 101, and a projection portion 104 forming the other end of bracket 101. Fixed portion 102 is fixed to attachment plate 93 by bolt 97. Projection portion 103 and projection portion 104 are bent with respect to fixed portion 102 and project away from attachment plate 93.

First image pick-up portion 51 of first stereo camera 50 is attached to projection portion 103. First image pick-up portion 51 is attached to a surface facing the right, of surfaces of projection portion 103 in a shape of a flat plate. Third image pick-up portion 61 of second stereo camera 60 is attached to projection portion 104. Third image pick-up portion 61 is attached to a surface facing the right, of surfaces of projection portion 104 in a shape of a flat plate.

A bracket 111 is attached to attachment plate 93. Bolt 97 passes through each of a through hole provided in bracket 111 and the through hole provided in attachment plate 93 and is fastened to the nut hole provided in attachment piece 92, so that bracket 111 is fixed to attachment plate 93. Bracket 111 is fixed to attachment angle bar 91 with attachment plate 93 and attachment piece 92 being interposed.

Bracket 111 is in a shape of an angular C. Bracket 111 may be formed by bending opposing end portions of one elongated flat plate. Bracket 111 has a fixed portion 112 forming a central portion of bracket 111, a projection portion 113 forming one end of bracket 111, and a projection portion 114 forming the other end of bracket 111. Fixed portion 112 is fixed to attachment plate 93 by bolt 97. Projection portion 113 and projection portion 114 are bent with respect to fixed portion 112 and project away from attachment plate 93.

Second image pick-up portion 52 of first stereo camera 50 is attached to projection portion 113. Second image pick-up portion 52 is attached to a surface facing the right, of surfaces of projection portion 113 in a shape of a flat plate. Fourth image pick-up portion 62 of second stereo camera 60 is attached to projection portion 114. Fourth image pick-up portion 62 is attached to a surface facing the right, of surfaces of projection portion 114 in a shape of a flat plate.

Figure 7:
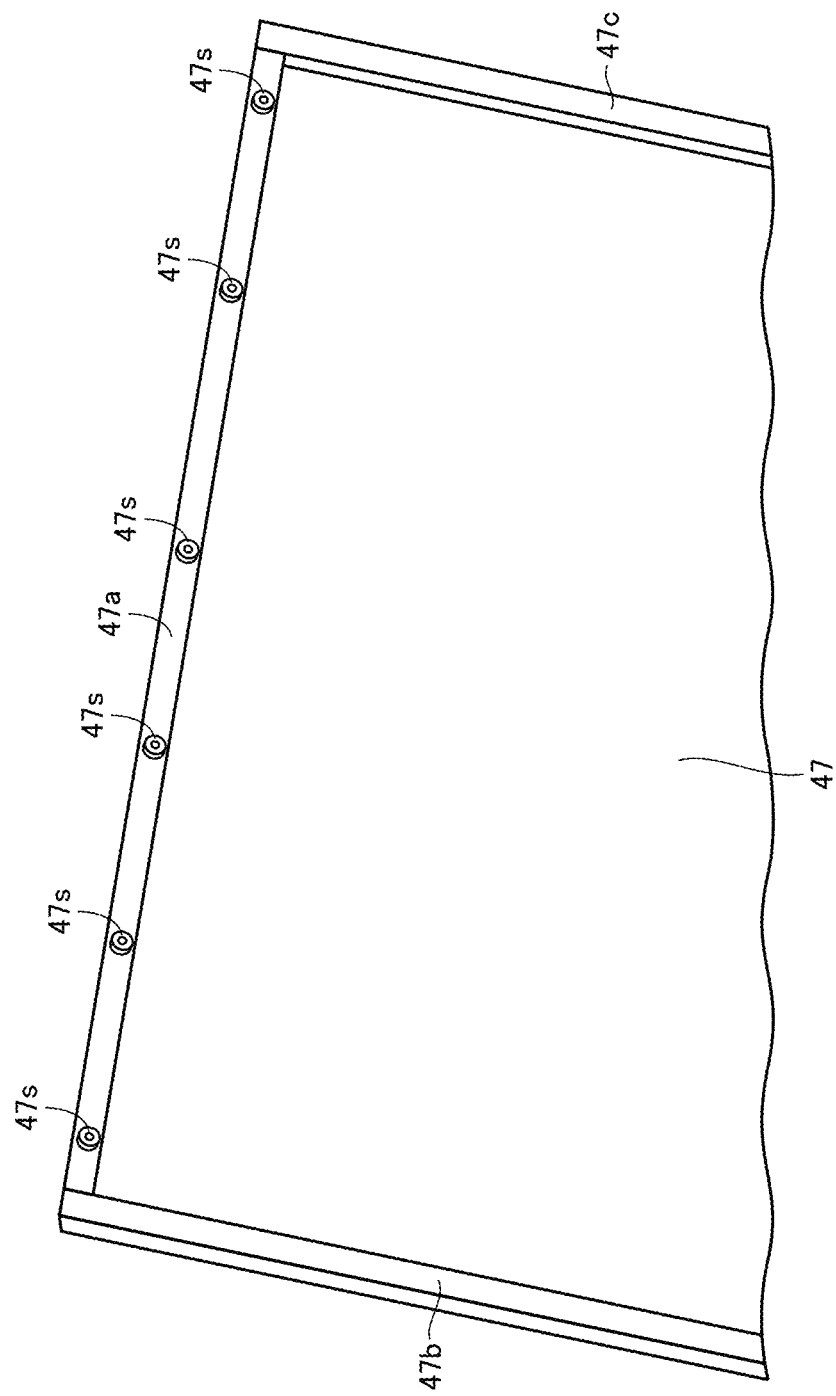
FIG. 7 is a perspective view showing overview of a construction of a front window.

FIG. 7 is a perspective view showing overview of a construction of front window 47. Front window 47 is formed in such a manner that a rectangularly surrounding frame body formed by an upper frame portion 47a, a left frame portion 47b, a right frame portion 47c, and a not-shown lower frame portion surrounds a peripheral edge of a transparent material such as tempered glass.

As shown in FIG. 7, upper frame portion 47a of front window 47 is provided with a plurality of seats 47s. Seats 47s as many as through holes provided in the one side of attachment angle bar 91 shown in FIG. 6 are formed. Seats 47s as many as bolts 95 shown in FIG. 6 are formed. A nut hole is provided in seat 47s. Bolt 95 passes through each through hole provided in the one side of attachment angle bar 91 and is fastened to seat 47s, so that attachment angle bar 91 is attached to seat 47s.

As a result of attachment of attachment angle bar 91 to seat 47s, the entire base portion 90, brackets 101 and 111 attached to base portion 90, first image pick-up portion 51 and third image pick-up portion 61 attached to bracket 101, and second image pick-up portion 52 and fourth image pick-up portion 62 attached to bracket 111 are arranged along the upper edge of front window 47. First image pick-up portion 51 and second image pick-up portion 52 constitute first stereo camera 50. Third image pick-up portion 61 and fourth image pick-up portion 62 constitute second stereo camera 60. First stereo camera 50 and second stereo camera 60 are arranged along the upper edge of front window 47 in cab 5 as shown in FIG. 5.

Figure 8:
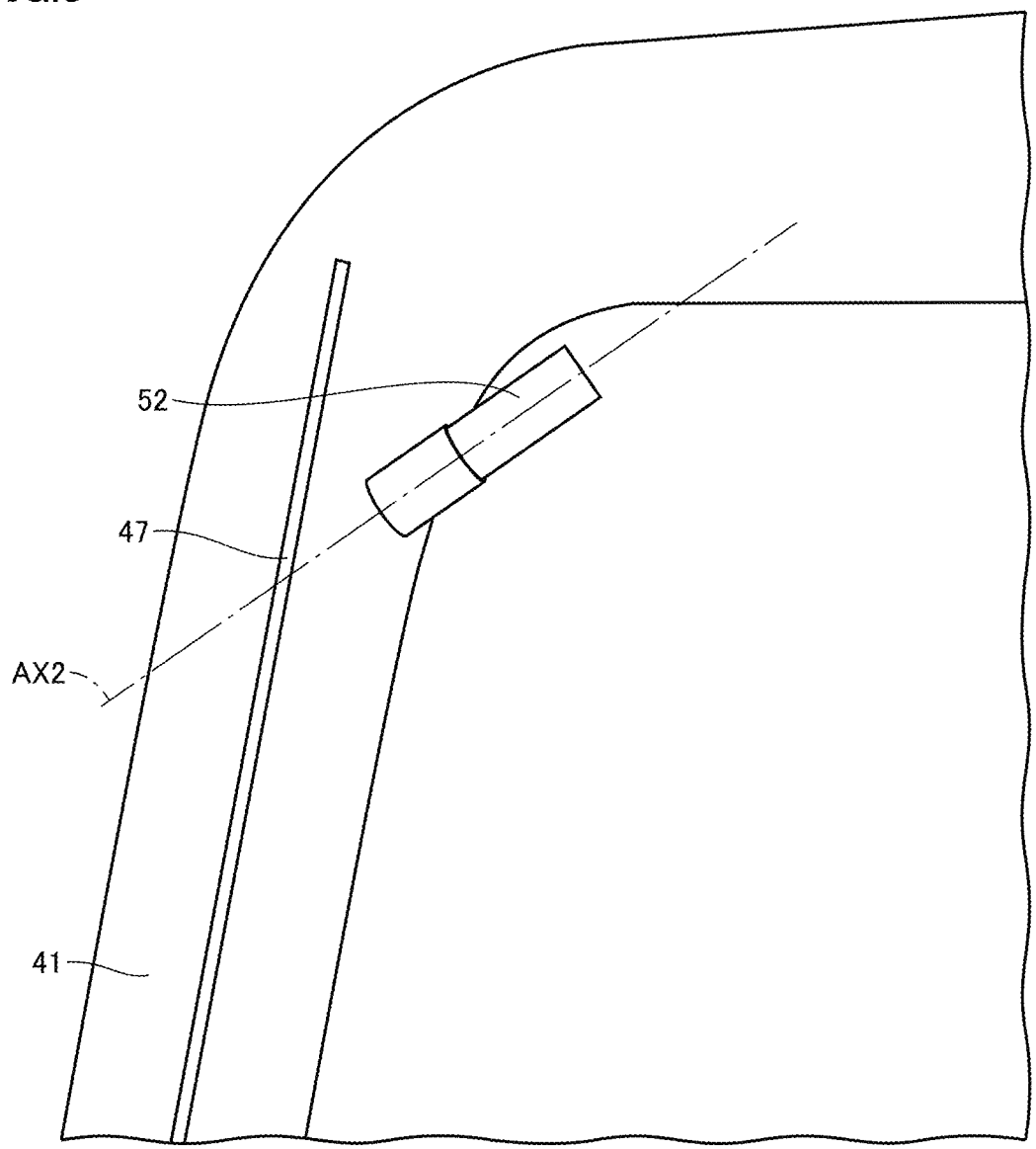
FIG. 8 is a schematic diagram of an image pick-up portion of a first stereo camera viewed from a side.

FIG. 8 is a schematic diagram of first stereo camera 50 viewed from a side. The left side in FIG. 8 refers to a front side of the vehicular main body, the right side in FIG. 8 refers to a rear side of the vehicular main body, an upper side in FIG. 8 refers to an upper side of the vehicular main body, and a lower side in FIG. 8 refers to a lower side of the vehicular main body. The lateral direction in FIG. 8 refers to the fore/aft direction of the vehicular main body and the upward/downward direction in FIG. 8 refers to the upward/downward direction of the vehicular main body. FIG. 8 shows only second image pick-up portion 52 of the image pick-up portions constituting first stereo camera 50. An optical axis AX2 shown with a chain dotted line in FIG. 8 indicates an optical axis of second image pick-up portion 52.

As shown in FIG. 8, second image pick-up portion 52 is arranged to face front window 47. Second image pick-up portion 52 is arranged at an angle looking down toward the front of cab 5. Optical axis AX2 of second image pick-up portion 52 forms a downward angle from a horizontal direction, in front of cab 5. Optical axis AX2 is inclined at an angle of depression with respect to the horizontal direction, in front of the vehicular main body.

Though FIG. 8 representatively shows second image pick-up portion 52 of the image pick-up portions constituting first stereo camera 50, first image pick-up portion 51 is arranged at a position the same as second image pick-up portion 52 in the side view. In the side view, an optical axis of first image pick-up portion 51 extends in a direction the same as optical axis AX2 of second image pick-up portion 52 shown in FIG. 8. The optical axis of first image pick-up portion 51 is inclined at an angle of depression with respect to the horizontal direction, in front of the vehicular main body.

Figure 9:
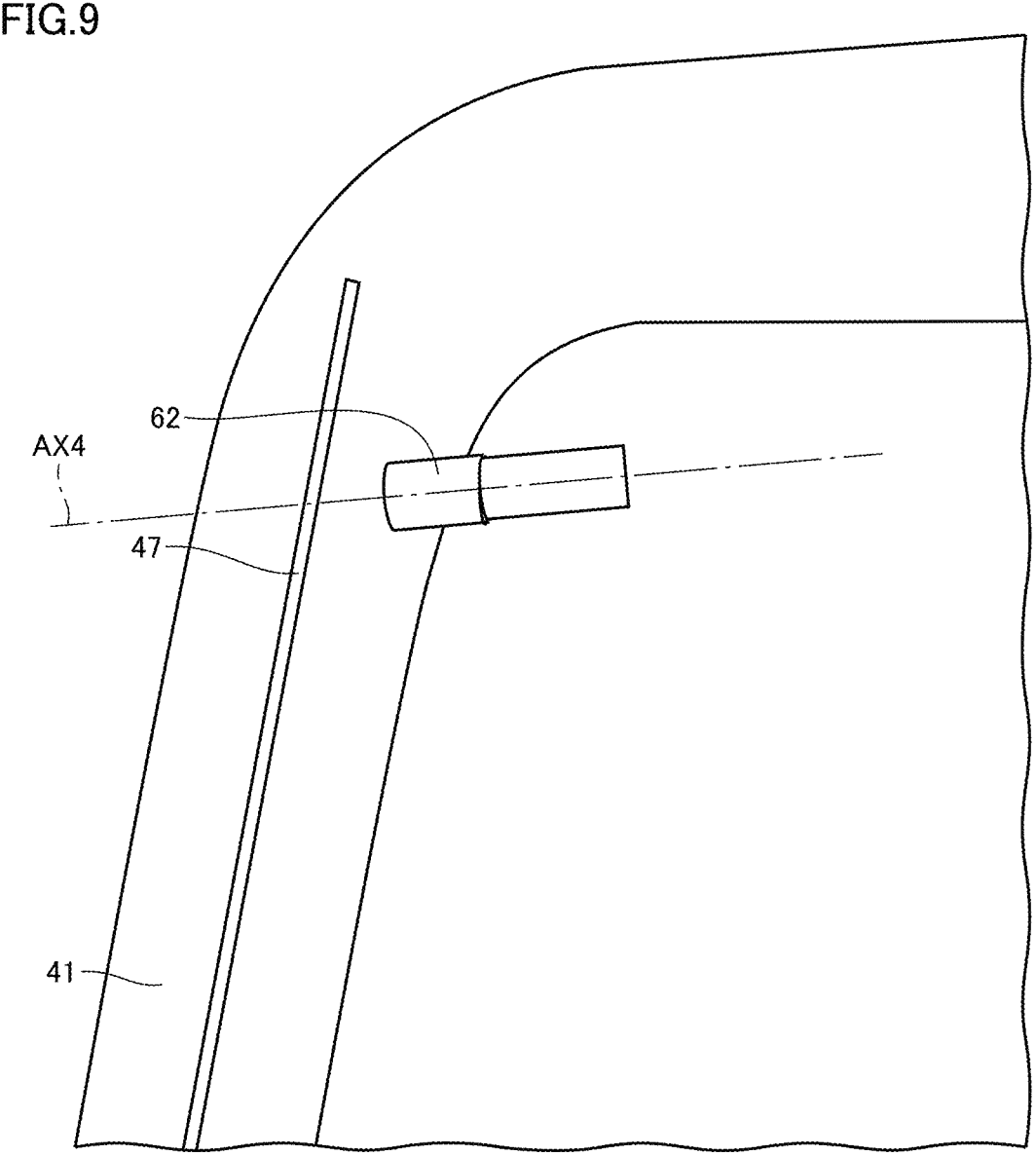
FIG. 9 is a schematic diagram of an image pick-up portion of a second stereo camera viewed from the side.

FIG. 9 is a schematic diagram of second stereo camera 60 viewed from the side. FIG. 9 shows fourth image pick-up portion 62 of second stereo camera 60 instead of second image pick-up portion 52 shown in FIG. 8. FIG. 9 shows only fourth image pick-up portion 62 of the image pick-up portions constituting second stereo camera 60. An optical axis AX4 shown with a chain dotted line in FIG. 9 indicates an optical axis of fourth image pick-up portion 62.

As shown in FIG. 9, fourth image pick-up portion 62 is arranged to face front window 47. Fourth image pick-up portion 62 is arranged at an angle slightly looking down toward the front of cab 5. Optical axis AX4 of fourth image pick-up portion 62 forms a downward angle from the horizontal direction, in front of cab 5. Optical axis AX4 is inclined at an angle of depression with respect to the horizontal direction, in front of the vehicular main body.

Though FIG. 9 representatively shows fourth image pick-up portion 62 of the image pick-up portions constituting second stereo camera 60, third image pick-up portion 61 is arranged at a position the same as fourth image pick-up portion 62 in the side view. In the side view, an optical axis of third image pick-up portion 61 extends in a direction the same as optical axis AX4 of fourth image pick-up portion 62 shown in FIG. 9. The optical axis of third image pick-up portion 61 is inclined at an angle of depression with respect to the horizontal direction, in front of the vehicular main body.

Based on comparison between FIGS. 8 and 9, the optical axis of first stereo camera 50 (matching with the optical axis of first image pick-up portion 51 and optical axis AX2 of second image pick-up portion 52 in the side views shown in FIGS. 8 and 9) is inclined at a greater angle with respect to the horizontal direction than the optical axis of second stereo camera 60 (matching with the optical axis of third image pick-up portion 61 and optical axis AX4 of fourth image pick-up portion 62 in the side views shown in FIGS. 8 and 9). An angle of depression of the optical axis of first stereo camera 50 is greater than the angle of depression of the optical axis of second stereo camera 60.

Figure 10:
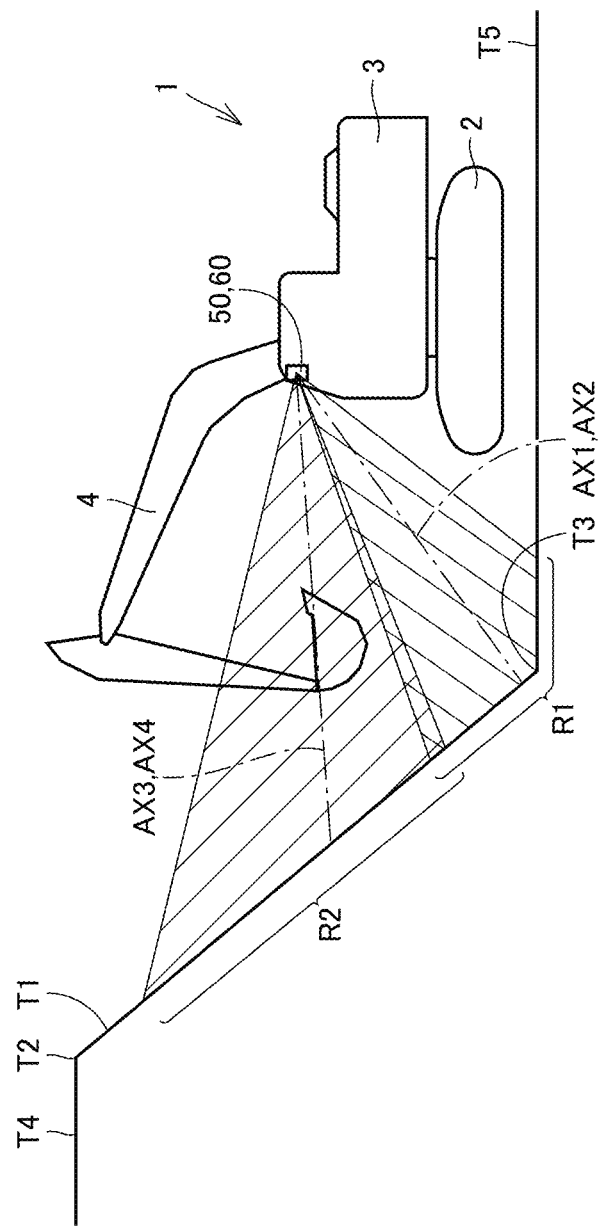
FIG. 10 is a schematic diagram showing a range of image pick-up by the stereo camera.

FIG. 10 is a schematic diagram showing a range R1 of image pick-up by first stereo camera 50 and a range R2 of image pick-up by second stereo camera 60. As described above, first stereo camera 50 and second stereo camera 60 are arranged in an upper front portion in cab 5. First stereo camera 50 and second stereo camera 60 are arranged at the same positions in the upward/downward direction. As shown in FIG. 10, first stereo camera 50 and second stereo camera 60 overlap each other in the side view. First image pick-up portion 51, second image pick-up portion 52, third image pick-up portion 61, and fourth image pick-up portion 62 are arranged at positions overlapping one another in the side view.

Optical axis AX2 shown in FIG. 10 indicates the optical axis of second image pick-up portion 52 described with reference to FIG. 8. An optical axis AX1 represents the optical axis of first image pick-up portion 51 and extends in a direction the same as optical axis AX2 in the side view shown in FIG. 10. Optical axis AX4 shown in FIG. 10 indicates the optical axis of fourth image pick-up portion 62 described with reference to FIG. 9. An optical axis AX3 represents the optical axis of third image pick-up portion 61 and extends in a direction the same as optical axis AX4 in the side view shown in FIG. 10.

Hydraulic excavator 1 shown in FIG. 10 performs work of a slope T1 with work implement 4. Slope T1 is the ground inclined with respect to the upward/downward direction between upper ground T4 and lower ground T5. A top of slope T2 refers to an uppermost end of slope T1. A toe of slope T3 refers to a lowermost end of slope T1. Top of slope T2 defines a boundary between slope T1 and upper ground T4. Toe of slope T3 defines a boundary between slope T1 and lower ground T5.

A range hatched with diagonal lines extending from upper right toward lower left in FIG. 10 represents a range within an angle of view in a vertical plane of first stereo camera 50 mounted on hydraulic excavator 1 located on a horizontal plane. First stereo camera 50 picks up an image of topography included in that angle of view. Image pick-up range R1 shown in FIG. 10 represents a first image pick-up range in the vertical plane of which image is picked up by first stereo camera 50. Image pick-up range R1 includes a part of lower ground T5, toe of slope T3, and a part of slope T1.

A range hatched with diagonal lines extending from upper left toward lower right in FIG. 10 represents a range within an angle of view in a vertical plane of second stereo camera 60 mounted on hydraulic excavator 1 located on the horizontal plane. Second stereo camera 60 picks up an image of topography included in that angle of view. Image pick-up range R2 shown in FIG. 10 represents a second image pick-up range in the vertical plane of which image is picked up by second stereo camera 60. Image pick-up range R2 includes a part of slope T1.

An angle of depression of the optical axis of first stereo camera 50 (matching with optical axis AX1 of first image pick-up portion 51 and optical axis AX2 of second image pick-up portion 52 in the side view shown in FIG. 10) is greater than an angle of depression of the optical axis of second stereo camera 60 (matching with optical axis AX3 of third image pick-up portion 61 and optical axis AX4 of fourth image pick-up portion 62 in the side view shown in FIG. 10). Therefore, first stereo camera 60 picks up an image of image pick-up range R1 relatively below. Second stereo camera 60 picks up an image of image pick-up range R2 relatively above. Second stereo camera 60 picks up an image of image pick-up range R2 above image pick-up range R1 of which image is picked up by first stereo camera 50.

Image pick-up range R1 overlaps image pick-up range R2. An upper edge portion of image pick-up range R1 and a lower edge portion of image pick-up range R2 overlap each other. An angle of view of first stereo camera 50 and an angle of view of second stereo camera 60 partially overlap with each other. Angles of view of first image pick-up portion 51, second image pick-up portion 52, third image pick-up portion 61, and fourth image pick-up portion 62 partially overlap with one another. A lower edge of image pick-up range R1 and an upper edge of image pick-up range R2 form an angle of approximately 90 degrees (an angle smaller than 90 degrees is shown in FIG. 10 for ease in viewing of the figure). With a vertical angle of view of approximately 90 degrees being set, an image of a region including a work region where work implement 4 of hydraulic excavator 1 performs work can be picked up.

Figure 11:
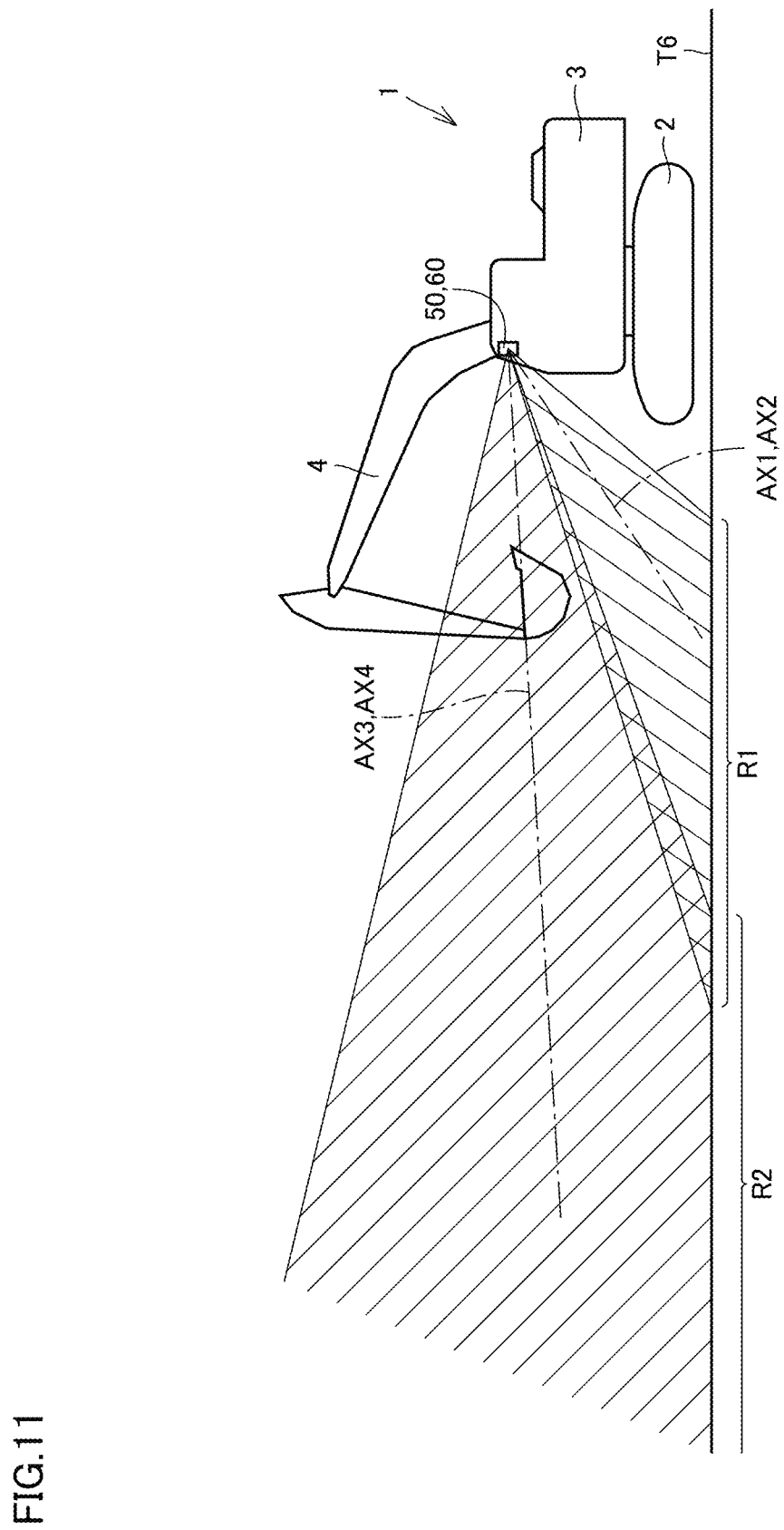
FIG. 11 is a schematic diagram showing a range of image pick-up by the stereo camera.

FIG. 11 is a schematic diagram showing range R1 of image pick-up by first stereo camera 50 in the vertical plane and range R2 of image pick-up by second stereo camera 60 in the vertical plane similarly to FIG. 10. Hydraulic excavator 1 shown in FIG. 11 performs work of a plane T6 which is topography different from the topography having slope T1 shown in FIG. 10.

An angle of depression of the optical axis of first stereo camera 50 (matching with optical axis AX1 of first image pick-up portion 51 and optical axis AX2 of second image pick-up portion 52 in the side view shown in FIG. 11) is greater than an angle of depression of the optical axis of second stereo camera 60 (matching with optical axis AX3 of third image pick-up portion 61 and optical axis AX4 of fourth image pick-up portion 62 in the side view shown in FIG. 11). Therefore, first stereo camera 50 picks up an image of image pick-up range R1 relatively close to the vehicular main body. Second stereo camera 60 picks up an image of image pick-up range R2 relatively distant from the vehicular main body. Second stereo camera 60 picks up an image of image pick-up range R2 beyond image pick-up range R1 of which image is picked up by first stereo camera 50. Image pick-up range R1 overlaps with image pick-up range R2. With image pick-up range R2, an image of a region farther from the vehicular main body than the work region where work implement 4 performs work can be picked up.

Figure 12:
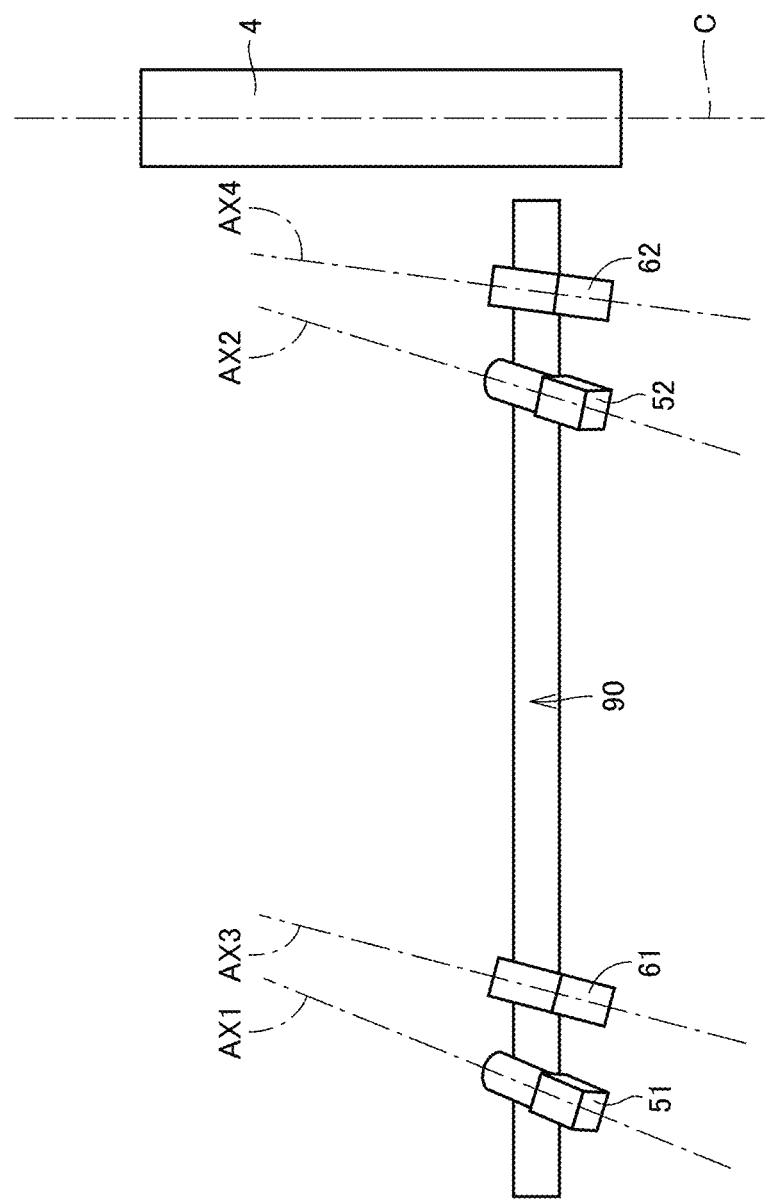
FIG. 12 is a schematic diagram of the image pick-up portion of the stereo camera when viewed planarly.

FIG. 12 is a schematic diagram of the first to fourth image pick-up portions of first stereo camera 50 and second stereo camera 60 when viewed planarly. FIG. 12 schematically shows a state that base portion 90 attached in cab 5, first image pick-up portion 51, second image pick-up portion 52, third image pick-up portion 61, and fourth image pick-up portion 62 supported on base portion 90, and work implement 4 are planarly viewed. The right side in FIG. 12 corresponds to the right direction of the vehicular main body, the left side in FIG. 12 corresponds to the left direction of the vehicular main body, the upper side in FIG. 12 corresponds to the fore direction of the vehicular main body, and the lower side in FIG. 12 corresponds to the aft direction of the vehicular main body.

FIG. 12 shows respective optical axes AX1, AX2, AX3, and AX4 of first image pick-up portion 51, second image pick-up portion 52, third image pick-up portion 61, and fourth image pick-up portion 62 described above. FIG. 12 shows a central axis C of work implement 4 with a chain dotted line. As shown in FIG. 12, a line which extends in a direction of extension of work implement 4 in the plan view and passes through the center of work implement 4 in a direction of a short side orthogonal to the direction of extension is defined as central axis C of work implement 4. Since work implement 4 in the present embodiment is pivotally supported on the front side of revolving unit 3 as described above, central axis C of work implement 4 extends in the fore/aft direction of the vehicular main body.

Optical axis AX1 of first image pick-up portion 51 and optical axis AX2 of second image pick-up portion 52 are inclined with respect to the direction of extension of central axis C of work implement 4 in the plan view as shown in FIG. 12. Optical axes AX1 and AX2 extend in a direction approaching work implement 4 as a distance from the vehicular main body is greater toward the front in the plan view. Optical axes AX1 and AX2 in the plan view intersect with central axis C of work implement 4 in front of the vehicular main body.

The optical axis of first stereo camera 50 in the plan view is defined as a direction of extension of a straight line which passes through a point of intersection of optical axis AX1 of first image pick-up portion 51 and optical axis AX2 of second image pick-up portion 52, divides an angle formed between optical axis AX1 and optical axis AX2 into two equal sections, and passes through a point intermediate between first image pick-up portion 51 and second image pick-up portion 52.

First image pick-up portion 51 is arranged at a position more distant from work implement 4 than second image pick-up portion 52 in the lateral direction of the vehicular main body. Optical axis AX1 of first image pick-up portion 51 and optical axis AX2 of second image pick-up portion 52 are inclined at angles different from each other with respect to the direction of extension of central axis C of work implement 4 in the plan view. An angle of inclination of optical axis AX1 of first image pick-up portion 51 with respect to the direction of extension of central axis C of work implement 4 is greater than an angle of inclination of optical axis AX2 of second image pick-up portion 52 with respect to the direction of extension of central axis C of work implement 4.

First image pick-up portion 51 and second image pick-up portion 52 are arranged such that optical axes AX1 and AX2 intersect with each other in front of the vehicular main body, instead of optical axes AX1 and AX2 being in parallel to each other. Therefore, the range of image pick-up by first image pick-up portion 51 reliably overlaps with the range of image pick-up by second image pick-up portion 52. Thus, even when first image pick-up portion 51 and second image pick-up portion 52 are arranged at a distance from each other in the lateral direction of the vehicular main body, a pair of images of an object picked up by first stereo camera 50 can reliably be obtained and a three-dimensional image of an object of which image is picked up can be constructed by subjecting the pair of images to stereo processing.

As shown in FIG. 12, optical axis AX3 of third image pick-up portion 61 and optical axis AX4 of fourth image pick-up portion 62 are inclined with respect to the direction of extension of central axis C of work implement 4 in the plan view. Optical axes AX3 and AX4 extend in the direction approaching work implement 4 as a distance from the vehicular main body is greater toward the front in the plan view. Optical axes AX3 and AX4 in the plan view intersect with central axis C of work implement 4 in front of the vehicular main body.

The optical axis of second stereo camera 60 in the plan view is defined as a direction of extension of a straight line which passes through a point of intersection of optical axis AX3 of third image pick-up portion 61 and optical axis AX4 of fourth image pick-up portion 62, divides an angle formed between optical axis AX3 and optical axis AX4 into two equal sections, and passes through a point intermediate between third image pick-up portion 61 and fourth image pick-up portion 62.

Third image pick-up portion 61 is arranged at a position more distant from work implement 4 than fourth image pick-up portion 62 in the lateral direction of the vehicular main body. Optical axis AX3 of third image pick-up portion 61 and optical axis AX4 of fourth image pick-up portion 62 are inclined at angles different from each other with respect to the direction of extension of central axis C of work implement 4 in the plan view. An angle of inclination of optical axis AX3 of third image pick-up portion 61 with respect to the direction of extension of central axis C of work implement 4 is greater than an angle of inclination of optical axis AX4 of fourth image pick-up portion 62 with respect to the direction of extension of central axis C of work implement 4.

Third image pick-up portion 61 and fourth image pick-up portion 62 are arranged such that optical axes AX3 and AX4 intersect with each other in front of the vehicular main body, instead of optical axes AX3 and AX4 being in parallel to each other. Therefore, the range of image pick-up by third image pick-up portion 61 reliably overlaps with the range of image pick-up by fourth image pick-up portion 62. Thus, even when third image pick-up portion 61 and fourth image pick-up portion 62 are arranged at a distance from each other in the lateral direction of the vehicular main body, a pair of images of an object picked up by second stereo camera 60 can reliably be obtained and a three-dimensional image of an object of which image is picked up can be constructed by subjecting the pair of images to stereo processing.

Figure 13:
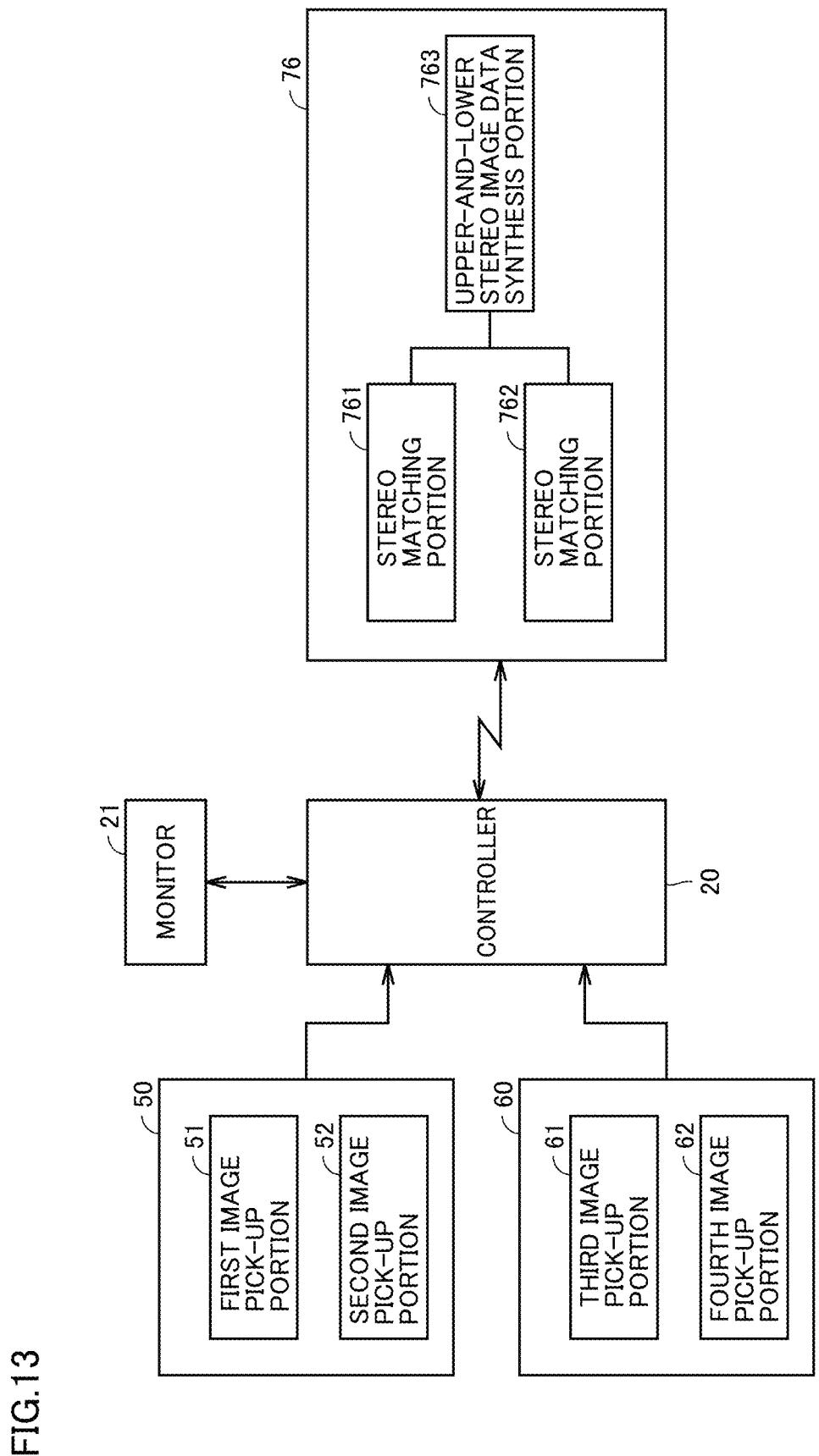
FIG. 13 is a functional block diagram showing a configuration of a stereo image data synthesis system.

FIG. 13 is a functional block diagram showing a configuration of a system for generating image data by using first stereo camera 50 and second stereo camera 60. As shown in FIG. 13, first stereo camera 50 has first image pick-up portion 51 and second image pick-up portion 52. Second stereo camera 60 has third image pick-up portion 61 and fourth image pick-up portion 62.

First stereo camera 50 is electrically connected to controller 20. First image pick-up portion 51 and second image pick-up portion 52 pick up an image in synchronization with each other, of a front region in front of the vehicular main body (image pick-up range R1 shown in FIGS. 10 and 11). Two-dimensional images picked up by first image pick-up portion 51 and second image pick-up portion 52 are input to controller 20. Controller 20 transmits data on two input two-dimensional images to external supervisory station 76.

Supervisory station 76 has a stereo matching portion 761. Stereo matching portion 761 implements a part of the image data generation system. Stereo matching portion 761 subjects the two-dimensional images simultaneously picked up by first image pick-up portion 51 and second image pick-up portion 52 from different angles to stereo matching and calculates image data on a three-dimensional shape of the front region of which image is picked up. More specifically, stereo matching portion 761 finds a three-dimensional shape of the front region by calculating a distance from first image pick-up portion 51 to the front region of which image is picked up and a distance from second image pick-up portion 52 to the front region by using principles of triangulation based on a parallax between first image pick-up portion 51 and second image pick-up portion 52.

Second stereo camera 60 is electrically connected to controller 20. Third image pick-up portion 61 and fourth image pick-up portion 62 pick up an image in synchronization with each other, of a front region in front of the vehicular main body (image pick-up range R2 shown in FIGS. 10 and 11). Two-dimensional images picked up by third image pick-up portion 61 and fourth image pick-up portion 62 are input to controller 20. Controller 20 transmits data on two input two-dimensional images to external supervisory station 76.

Supervisory station 76 has a stereo matching portion 762. Stereo matching portion 762 implements a part of the image data generation system. Stereo matching portion 762 subjects the two-dimensional images simultaneously picked up by third image pick-up portion 61 and fourth image pick-up portion 62 from different angles to stereo matching and calculates image data on a three-dimensional shape of the front region of which image is picked up. More specifically, stereo matching portion 762 finds a three-dimensional shape of the front region by calculating a distance from third image pick-up portion 61 to the front region of which image is picked up and a distance from fourth image pick-up portion 62 to the front region by using principles of triangulation based on a parallax between third image pick-up portion 61 and fourth image pick-up portion 62.

As described with reference to FIGS. 10 and 11, second stereo camera 60 picks up an image of image pick-up range R2 above or beyond range R1 of image pick-up by first stereo camera 50. The upper edge portion of image pick-up range R1 overlaps with the lower edge portion of image pick-up range R2. Therefore, the three-dimensional shape of the front region found in stereo matching portion 762 shows topography above or beyond the three-dimensional shape of the front region found in stereo matching portion 761. The lower edge portion of the three-dimensional shape found in stereo matching portion 762 is common in shape to the upper edge portion of the three-dimensional shape found in stereo matching portion 761.

Supervisory station 76 further has an upper-and-lower stereo image data synthesis portion 763. Upper-and-lower stereo image data synthesis portion 763 synthesizes image data calculated by stereo matching portion 761 and image data calculated by stereo matching portion 762 into one. Image data is synthesized by projecting one image data on a coordinate system of the other image data based on relative positions of first stereo camera 50 and second stereo camera 60. Two pieces of image data are synthesized as being aligned vertically such that common three-dimensional shapes overlap each other. Thus, such image data that ranges from toe of slope T3 to top of slope T2 of slope T1 shown in FIG. 10 are synthesized over a wide range can be obtained.

Figure 14:
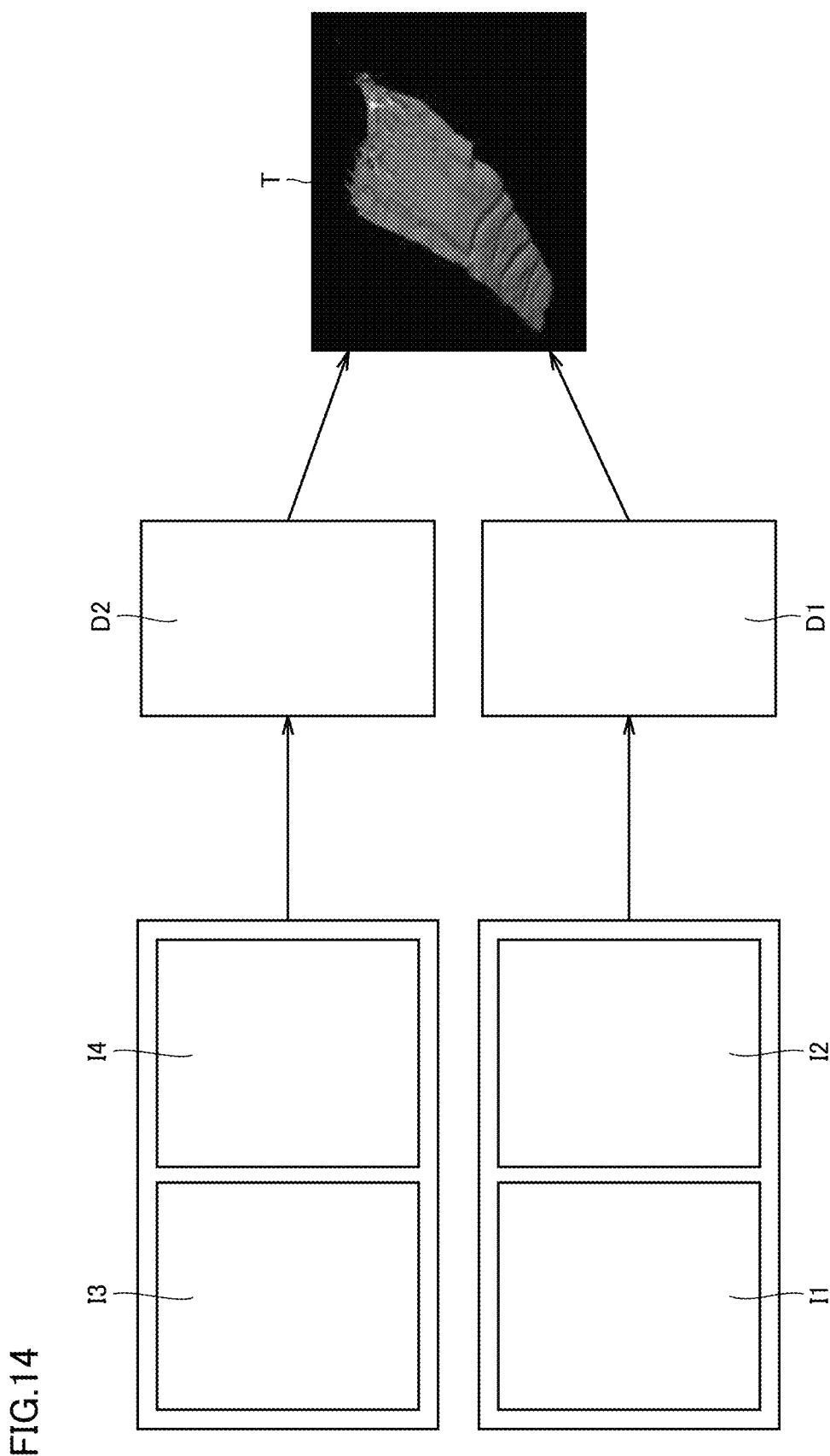
FIG. 14 is a diagram showing one example of synthesis of image data.

FIG. 14 is a diagram showing one example of synthesis of image data. An obtained image I1 shown in FIG. 14 represents a two-dimensional image picked up by first image pick-up portion 51 of first stereo camera 50. An obtained image I2 represents a two-dimensional image picked up by second image pick-up portion 52 of first stereo camera 50. An obtained image I3 represents a two-dimensional image picked up by third image pick-up portion 61 of second stereo camera 60. An obtained image I4 represents a two-dimensional image picked up by fourth image pick-up portion 62 of second stereo camera 60.

As schematically shown in FIG. 14 and shown in further detail in FIGS. 16 and 17 which will be described later, obtained images I1 to I4 are in a vertically long shape. As described above, as the light reception surfaces of the image pick-up elements of the image pick-up portions are longitudinally arranged, obtained images I1 to I4 picked up by respective image pick-up portions are in a vertically long shape. Each image pick-up portion is configured to be able to pick up a vertically long image. First stereo camera 50 and second stereo camera 60 are configured to be able to pick up a vertically long image.

A parallax image D1 represents an image generated through stereo matching processing of obtained image I1 and obtained image I2. A parallax image D2 represents an image generated through stereo matching processing of obtained image I3 and obtained image I4. By calculating a parallax value between pixels in obtained image I1 and pixels in obtained image I2, parallax image D1 is created. By calculating a parallax value between pixels in obtained image I3 and pixels in obtained image I4, parallax image D2 is created.

Topography data T is image data three-dimensionally showing existing topography in front of the vehicular main body which is obtained by synthesizing parallax image D1 and parallax image D2 with each other. By synthesizing parallax image D1 and parallax image D2 with each other with the images being vertically aligned, such topography data T that ranges from toe of slope T3 to top of slope T2 of slope T1 shown in FIG. 10 are synthesized with each other over a wide range is created. Topography data T includes a three-dimensional shape of existing topography in front of the vehicular main body.

Figure 15:
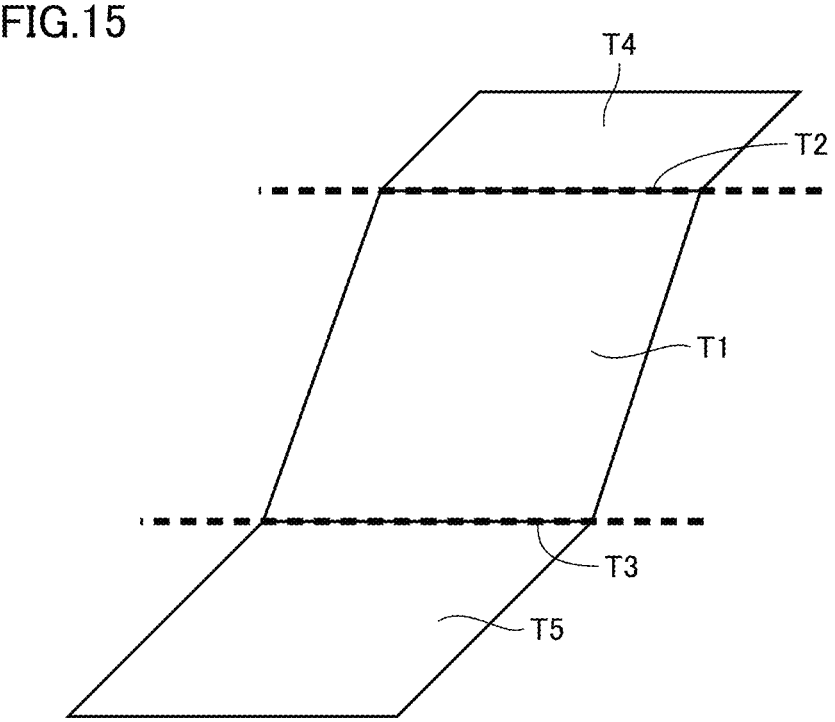
FIG. 15 is a schematic diagram showing one example of topography of which image is picked up.

FIG. 15 is a schematic diagram showing one example of topography of which image is picked up. The topography shown in FIG. 15 has slope T1 similarly to the topography described with reference to FIG. 10. Slope T1 is inclined with respect to the upward/downward direction between upper ground T4 and lower ground T5. A boundary between slope T1 and upper ground T4 is defined as top of slope T2 and a boundary between slope T1 and lower ground T5 is defined as toe of slope T3.

Figure 16:
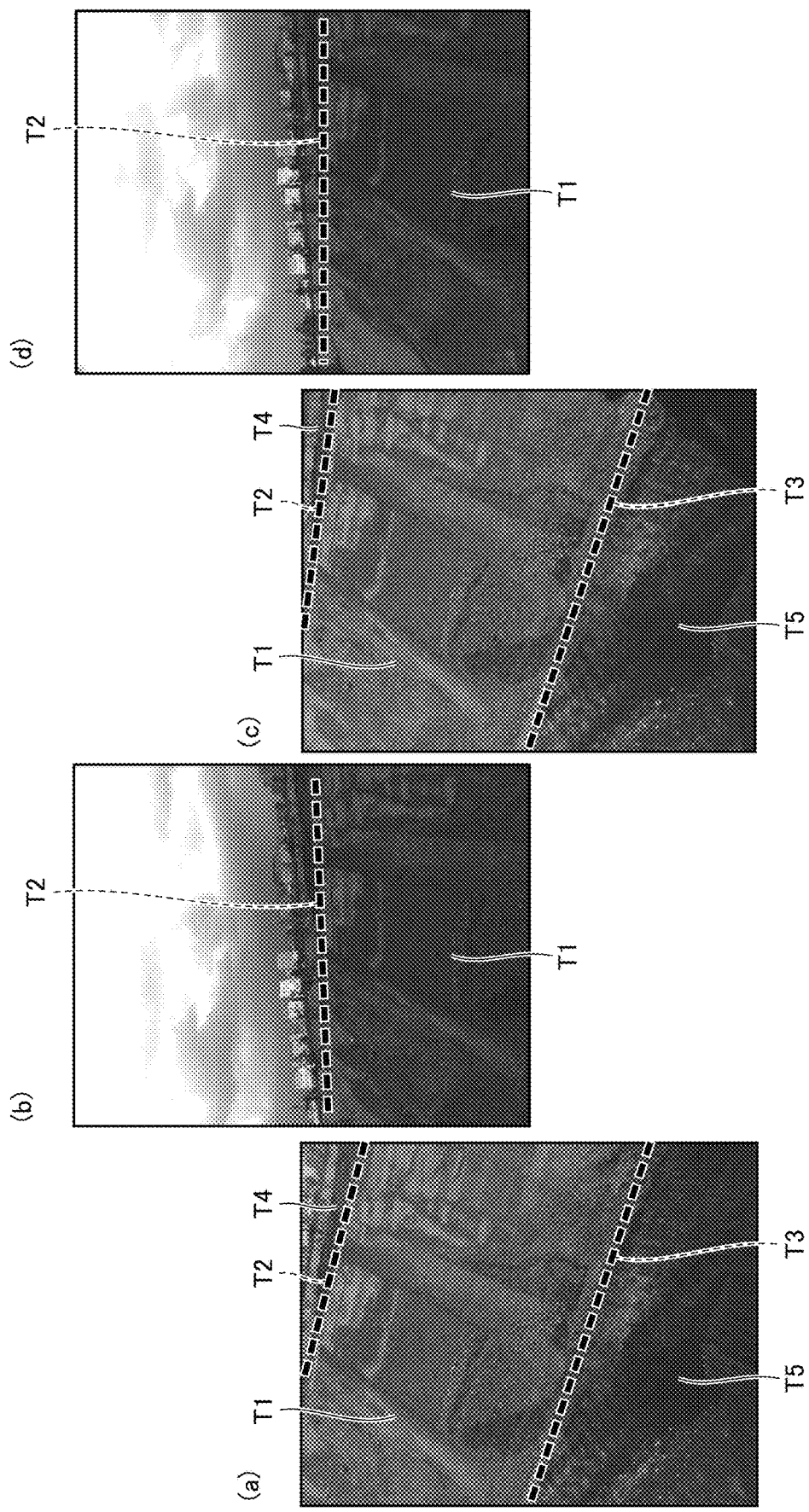
FIG. 16 is a diagram showing exemplary image pick-up by each image pick-up portion.

FIG. 16 is a diagram showing exemplary image pick-up by each image pick-up portion. FIG. 16 (*a*) shows a two-dimensional image resulting from image pick-up of the topography shown in FIG. 15 by first image pick-up portion 51. FIG. 16 (*b*) shows a two-dimensional image resulting from image pick-up of the topography shown in FIG. 15 by third image pick-up portion 61. FIG. 16 (*c*) shows a two-dimensional image resulting from image pick-up of the topography shown in FIG. 15 by second image pick-up portion 52. FIG. 16 (*d*) shows a two-dimensional image resulting from image pick-up of the topography shown in FIG. 15 by fourth image pick-up portion 62.

Images picked up by first image pick-up portion 51 and second image pick-up portion 52 constituting first stereo camera 50 include both of top of slope T2 and toe of slope T3 as shown in FIG. 16 (*a*) and FIG. 16 (*c*). An image picked up by first stereo camera 50 includes entire slope T1 in a direction of height.

Images picked up by third image pick-up portion 61 and fourth image pick-up portion 62 constituting second stereo camera 60 include top of slope T2 but do not include toe of slope T3 as shown in FIG. 16 (*b*) and FIG. 16 (*d*). An image picked up by second stereo camera 60 includes an upper end portion of slope T1 in the direction of height and topography above slope T1.

As shown in FIG. 16, an upper edge portion of the image picked up by first stereo camera 50 and a lower edge portion of the image picked up by second stereo camera 60 are common to each other in shape. The image pick-up range of first stereo camera 50 and the image pick-up range of second stereo camera 60 include an overlapping region. Therefore, by synthesizing the image picked up by first stereo camera 50 and the image picked up by second stereo camera 60 with each other as vertically aligning these images with the image picked up by first stereo camera 50 being located below and the image picked up by second stereo camera 60 being located above, such image data that ranges from lower ground T5 below slope T1 to upper ground T4 above slope T1 are synthesized over a wide range can be generated.

Figure 17:
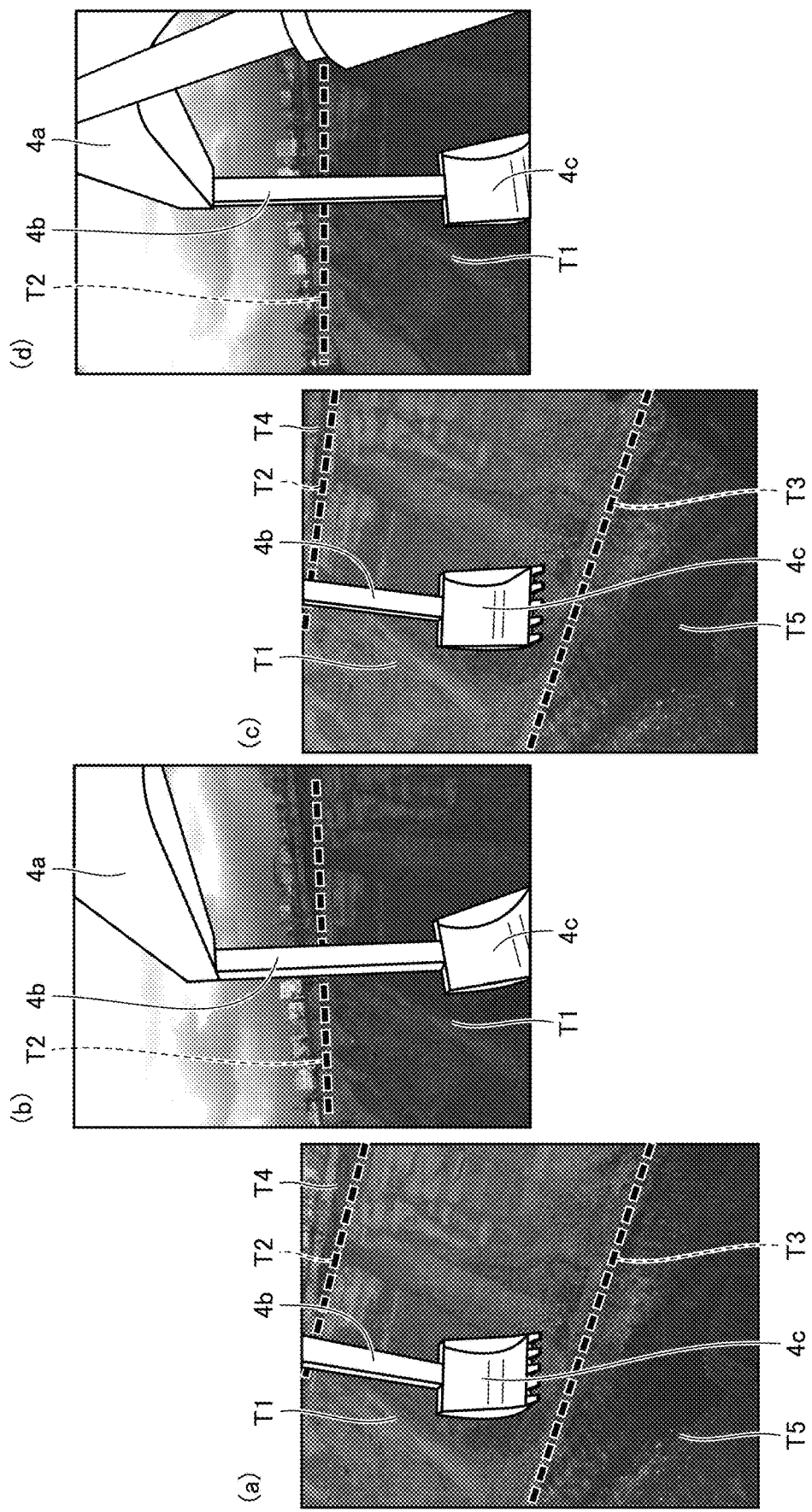
FIG. 17 is a diagram showing exemplary image pick-up by each image pick-up portion.

FIG. 17 is a diagram showing exemplary image pick-up by each image pick-up portion. Though FIG. 17 shows an image resulting from image pick-up of the same topography as in image pick-up shown in FIG. 16, work implement 4 is included in the images picked up by first stereo camera 50 and second stereo camera 60. Work implement 4 is present in the angle of view of first stereo camera 50 and second stereo camera 60. Since work implement 4 hides a part of existing topography of slope T1, existing topography cannot accurately be known even by image pick-up shown in FIG. 17. A method of generating image data allowing more accurate generation of image data on a front region in front of the vehicular main body will be described below.

Figure 18:
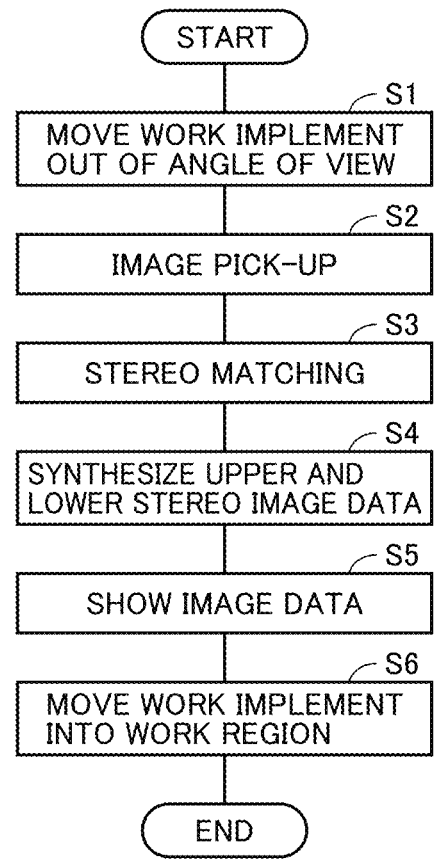
FIG. 18 is a flowchart illustrating a method of generating image data based on an embodiment.
Figure 19:
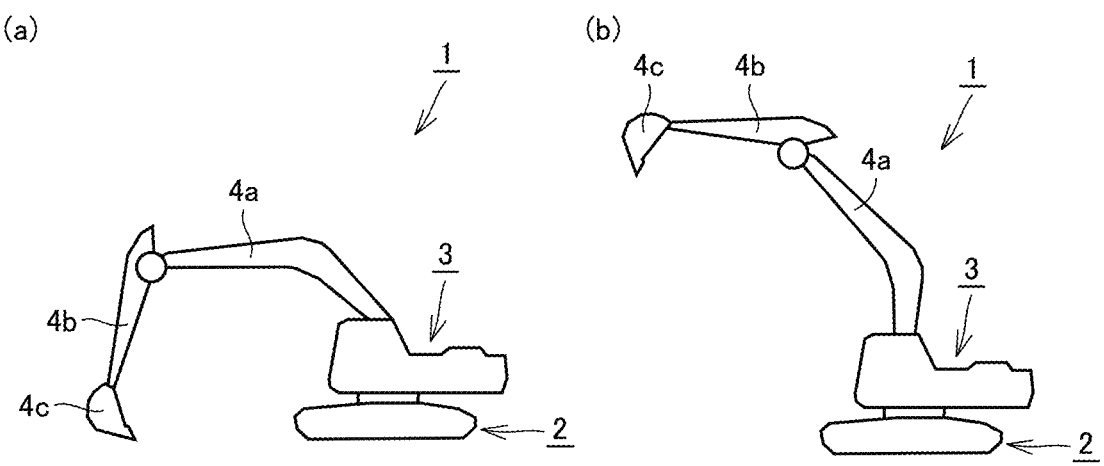
FIG. 19 is a schematic diagram showing movement of a work implement out of an angle of view of the stereo camera.

FIG. 18 is a flowchart illustrating a method of generating image data based on an embodiment. Initially, work implement 4 within an angle of view of the stereo camera as shown in FIG. 17 is moved out of the angle of view (step S1). FIG. 19 is a schematic diagram showing movement of work implement 4 out of an angle of view of the stereo camera. FIG. 19 (a) shows hydraulic excavator 1 of which work implement 4 is performing work and FIG. 19 (b) shows hydraulic excavator 1 in such a state that work implement 4 has moved out of the angle of view of the stereo camera.

Controller 20 shown in FIGS. 2 and 3 measures a stroke length of bucket cylinder 4d, arm cylinder 4e, and boom cylinder 4f based on a detection signal from position sensor 10. Controller 20 determines a current position of work implement 4 based on the stroke length of each hydraulic cylinder. Controller 20 determines whether or not work implement 4 is within an angle of view of first stereo camera 50 and second stereo camera 60 based on the current position of work implement 4 and a set value for the angle of view of first stereo camera 50 and second stereo camera 60.

When it is determined that work implement 4 is within the angle of view of the stereo camera, controller 20 has work implement 4 moved out of the angle of view of the stereo camera. Specifically, controller 20 transmits an operation signal to boom directional valve 14b and arm directional valve 14d shown in FIG. 2 to thereby raise boom 4a and arm 4b. Controller 20 receives a detection signal indicating that arm cylinder 4e has reached the stroke end on a contraction side and a detection signal indicating that boom cylinder 4f has reached the stroke end on the contraction side from position sensors 10 shown in FIG. 3. Controller 20 which has received these detection signals recognizes movement of work implement 4 as far as a position shown in FIG. 19 (b) and determines that work implement 4 has moved out of the angle of view of the stereo camera.

Then, an image is picked up (step S2). First image pick-up portion 51 and second image pick-up portion 52 constituting first stereo camera 50 and third image pick-up portion 61 and fourth image pick-up portion 62 constituting second stereo camera 60 pick up images of the front region in front of the vehicular main body all in synchronization. Since work implement 4 has moved out of the angle of view of the stereo cameras in previous step S1, work implement 4 is not present in the picked up images as shown in FIG. 16. The image pick-up apparatus picks up an image of the front region with work implement 4 having been moved out of the angle of view.

Then, stereo matching is performed (step S3). The image picked up by first image pick-up portion 51 shown in FIG. 16 (a) (corresponding to obtained image I1 in FIG. 14) and the image picked up by second image pick-up portion 52 shown in FIG. 16 (c) (corresponding to obtained image I2 in FIG. 14) are subjected to stereo matching processing to thereby generate image data of parallax image D1 shown in FIG. 14. The image picked up by third image pick-up portion 61 shown in FIG. 16 (b) (corresponding to obtained image I3 in FIG. 14) and the image picked up by fourth image pick-up portion 62 shown in FIG. 16 (d) (corresponding to obtained image I4 in FIG. 14) are subjected to stereo matching processing to thereby generate image data of parallax image D2 shown in FIG. 14.

Then, pieces of upper and lower stereo image data are synthesized with each other (step S4). Image data of parallax image D1 and image data of parallax image D2 obtained in step S3 are synthesized with each other as being vertically aligned with parallax image D1 being located below and parallax image D2 being located above such that common shapes overlap each other. Here, the image data of parallax image D1 and the image data of parallax image D2 are synthesized with each other in a longitudinal direction of each image data. Topography data T shown in FIG. 14 is thus created.

Then, image data is shown (step S5). Controller 20 has monitor 21 shown in FIG. 2 show topography data T of existing topography created in step S4. Monitor 21 shows execution design data on an object to be worked and topography data T showing existing topography. An operator can check a state of work at the current time point by checking representation on monitor 21 in cab 5.

Then, work implement 4 is moved into a work region where work is to be performed (step S6). Work implement 4 which has been moved out of the angle of view of the stereo camera during image pick-up as shown in FIG. 19 (b) is returned to be within the angle of view of the stereo camera in front of the vehicular main body. Thus, preparation for next work by work implement 4 is done. A series of processes for generation of image data thus ends (end).

In the embodiment above, movement of work implement 4 out of the angle of view of the stereo camera is determined based on the fact that arm cylinder 4e and boom cylinder 4f reach the stroke end on the contraction side. In another embodiment, movement of work implement 4 out of the angle of view may be determined based on the fact that boom cylinder 4f has reached the stroke end on the contraction side and arm cylinder 4e and bucket cylinder 4d have reached the stroke end on an extension side.

Figure 20:
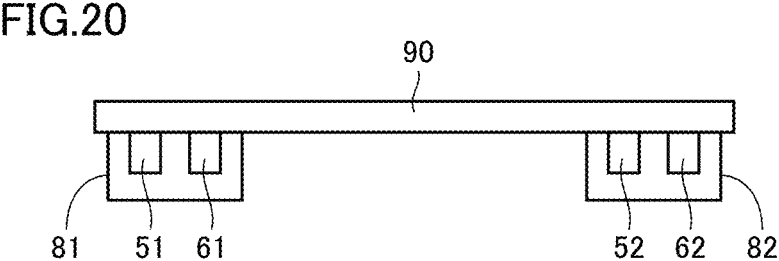
FIG. 20 is a schematic diagram showing arrangement of each image pick-up portion with respect to the base portion.

FIG. 20 is a schematic diagram showing arrangement of each image pick-up portion with respect to base portion 90. FIG. 20 schematically shows base portion 90, first image pick-up portion 51 and second image pick-up portion 52 constituting first stereo camera 50, third image pick-up portion 61 and fourth image pick-up portion 62 constituting second stereo camera 60, left case 81, and right case 82 described with reference to FIGS. 4, 5, and 6.

As shown in FIG. 20, second image pick-up portion 52 is arranged on the right of first image pick-up portion 51. Fourth image pick-up portion 62 is arranged on the right of third image pick-up portion 61. First image pick-up portion 51 and third image pick-up portion 61 constitute the left image pick-up portion group. The left image pick-up portion group is accommodated in left case 81. Second image pick-up portion 52 and fourth image pick-up portion 62 constitute the right image pick-up portion group. The right image pick-up portion group is accommodated in right case 82. The left image pick-up portion group and the right image pick-up portion group are arranged at a distance from each other in the lateral direction.

First image pick-up portion 51, third image pick-up portion 61, second image pick-up portion 52, and fourth image pick-up portion 62 are arranged sequentially from the left to the right in the lateral direction. An interval between third image pick-up portion 61 and second image pick-up portion 52 in the lateral direction is greater than an interval between first image pick-up portion 51 and third image pick-up portion 61. The interval between third image pick-up portion 61 and second image pick-up portion 52 in the lateral direction is greater than an interval between second image pick-up portion 52 and fourth image pick-up portion 62.

Figure 21:
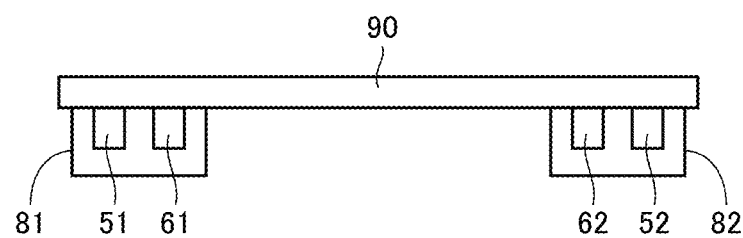
FIG. 21 is a schematic diagram showing arrangement of each image pick-up portion with respect to the base portion.

FIG. 21 is a schematic diagram showing arrangement of each image pick-up portion with respect to base portion 90 similarly to FIG. 20. Similarly to FIG. 20, first image pick-up portion 51 and third image pick-up portion 61 constitute the left image pick-up portion group and is accommodated in left case 81. Second image pick-up portion 52 and fourth image pick-up portion 62 constitute the right image pick-up portion group and is accommodated in right case 82. A modification shown in FIG. 21 is different from the example shown in FIG. 20 in that positions of second image pick-up portion 52 and fourth image pick-up portion 62 in the lateral direction are interchanged. In the modification shown in FIG. 21, first image pick-up portion 51, third image pick-up portion 61, fourth image pick-up portion 62, and second image pick-up portion 52 are arranged sequentially from the left to the right in the lateral direction.

In the modification shown in FIG. 21 as well, the left image pick-up portion group and the right image pick-up portion group are arranged at a distance from each other in the lateral direction. Third image pick-up portion 61 on the right in the left image pick-up portion group and fourth image pick-up portion 62 on the left in the right image pick-up portion group are arranged at a distance from each other in the lateral direction. An interval between third image pick-up portion 61 and fourth image pick-up portion 62 in the lateral direction is greater than the interval between first image pick-up portion 51 and third image pick-up portion 61 constituting the left image pick-up portion group and greater than an interval between second image pick-up portion 52 and fourth image pick-up portion 62 constituting the right image pick-up portion group.

Figure 22:
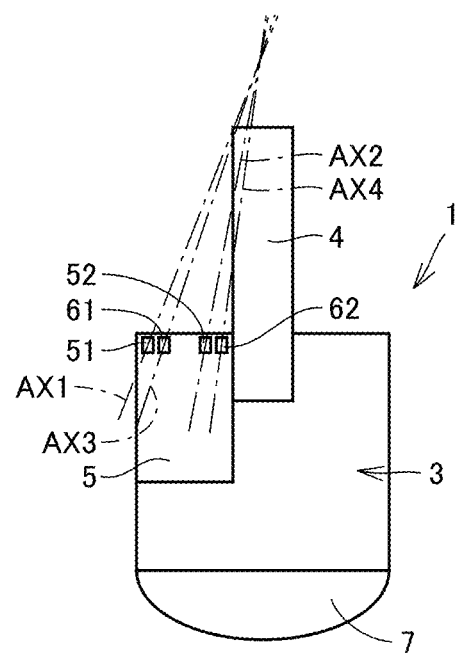
FIG. 22 is a schematic diagram showing arrangement in a plan view, of each image pick-up portion with respect to a vehicular main body.

FIG. 22 is a schematic diagram showing arrangement in a plan view, of each image pick-up portion with respect to the vehicular main body. FIG. 22 schematically shows revolving unit 3, work implement 4, cab 5, and counterweight 7 described with reference to FIG. 1. FIG. 22 schematically shows first image pick-up portion 51, second image pick-up portion 52, third image pick-up portion 61, and fourth image pick-up portion 62.

First image pick-up portion 51, second image pick-up portion 52, third image pick-up portion 61, and fourth image pick-up portion 62 are arranged in cab 5 as also shown in FIG. 5.

The optical axis of each of first image pick-up portion 51 and second image pick-up portion 52 is inclined in the direction intersecting with central axis C of work implement 4 described with reference to FIG. 12 in the plan view. The optical axes of first image pick-up portion 51 and second image pick-up portion 52 are inclined at angles different from each other with respect to central axis C of work implement 4 in the plan view. First image pick-up portion 51 is arranged at a position more distant from work implement 4 than second image pick-up portion 52 in the lateral direction. An angle of inclination of first image pick-up portion 51 with respect to central axis C of work implement 4 is greater than an angle of inclination of second image pick-up portion 52 with respect to central axis C of work implement 4.

The optical axis of each of third image pick-up portion 61 and fourth image pick-up portion 62 is inclined in the direction intersecting with central axis C of work implement 4 in the plan view. The optical axes of third image pick-up portion 61 and fourth image pick-up portion 62 are inclined at angles different from each other with respect to central axis C of work implement 4 in the plan view. Third image pick-up portion 61 is arranged at a position more distant from work implement 4 than fourth image pick-up portion 62 in the lateral direction. An angle of inclination of third image pick-up portion 61 with respect to central axis C of work implement 4 is greater than an angle of inclination of fourth image pick-up portion 62 with respect to central axis C of work implement 4.

Figure 23:
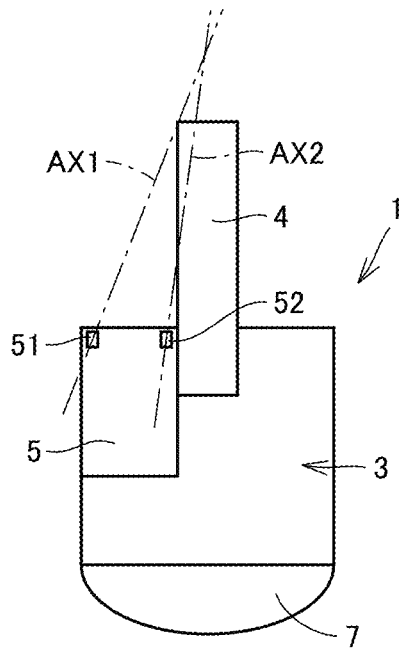
FIG. 23 is a schematic diagram showing arrangement in a plan view, of each image pick-up portion with respect to the vehicular main body.

FIG. 23 is a schematic diagram showing arrangement in a plan view, of each image pick-up portion with respect to the vehicular main body similarly to FIG. 22. Though hydraulic excavator 1 has first stereo camera 50 and second stereo camera 60 in the embodiment described so far, limitation to such a construction is not intended. As shown in FIG. 23, hydraulic excavator 1 may have only first stereo camera 50.

As shown in FIG. 23, first stereo camera 50 has first image pick-up portion 51 and second image pick-up portion 52. First image pick-up portion 51 and second image pick-up portion 52 are arranged at a distance from each other in the lateral direction. First image pick-up portion 51 is arranged as being closer to left pillar 42 shown in FIGS. 4 and 5 than to the center of cab 5 in the lateral direction. Second image pick-up portion 52 is arranged as being closer to right pillar 41 shown in FIGS. 4 and 5 than to the center of cab 5 in the lateral direction.

An example in which each image pick-up portion constituting stereo camera 50 is arranged in cab 5 has been described in the embodiment described so far. Each image pick-up portion may be mounted on roof panel 49 (FIGS. 4 and 5) of cab 5 while arrangement in the plan view shown in FIG. 20 or 21 is maintained.

Figure 24:
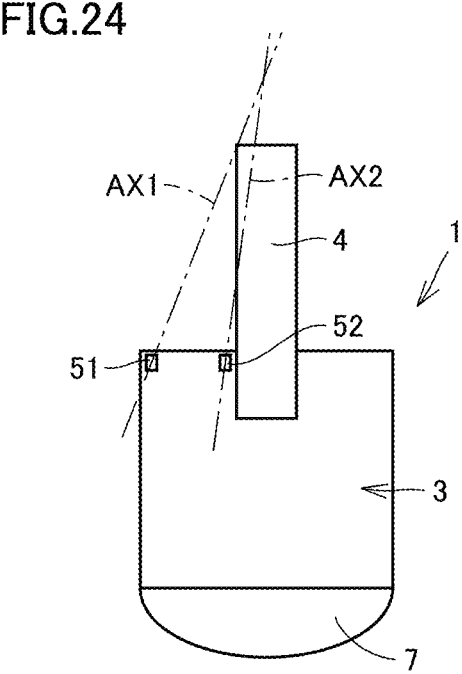
FIG. 24 is a schematic diagram showing arrangement in a plan view, of each image pick-up portion with respect to the vehicular main body.

FIG. 24 is a schematic diagram showing arrangement in a plan view, of each image pick-up portion with respect to the vehicular main body similarly to FIG. 23. In the embodiment described so far, hydraulic excavator 1 has cab 5 and each image pick-up portion constituting a stereo camera is attached to cab 5. Hydraulic excavator 1 does not necessarily have to have cab 5. Hydraulic excavator 1 is not limited to such specifications that an operator gets on hydraulic excavator 1 and operates hydraulic excavator 1, but it may be operated as being remotely controlled from outside. In this case, since hydraulic excavator 1 does not require cab 5 for an operator to get on, it does not have to have cab 5.

The lateral direction and the fore/aft direction of hydraulic excavator 1 without cab 5 refer to the same directions as the lateral direction and the fore/aft direction defined for hydraulic excavator 1 having cab 5 described so far. The fore/aft direction refers to a direction of extension of a plane along which work implement 4 operates in the plan view. The fore/aft direction refers to a plane in the plan view through which boom 4a of work implement 4 which rotationally moves around the boom pin with respect to revolving unit 3 passes. The lateral direction refers to a direction orthogonal to the fore/aft direction in the plan view.

In the example in which cab 5 is not provided shown in FIG. 24 as well, arrangement of first image pick-up portion 51 and second image pick-up portion 52 in the plan view is the same as in FIG. 23. Optical axis AX1 of first image pick-up portion 51 and optical axis AX2 of second image pick-up portion 52 are inclined toward the work implement with respect to central axis C of work implement 4 as in FIG. 23 as a distance from the vehicular main body is greater. Optical axis AX1 of first image pick-up portion 51 and optical axis AX2 of second image pick-up portion 52 are inclined at angles different from each other with respect to central axis C of work implement 4. An angle of inclination of first image pick-up portion 51 with respect to central axis C of work implement 4 is greater than an angle of inclination of second image pick-up portion 52 with respect to central axis C of work implement 4.

Figure 25:
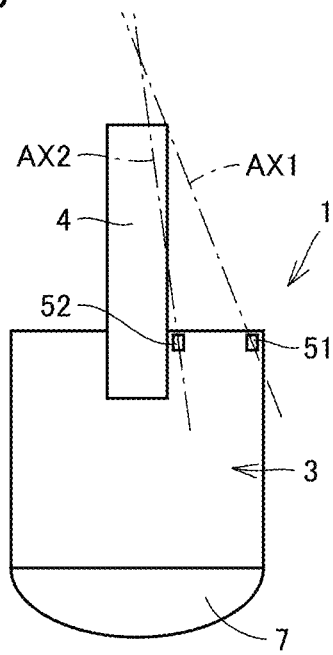
FIG. 25 is a schematic diagram showing arrangement in a plan view, of each image pick-up portion with respect to the vehicular main body.

FIG. 25 is a schematic diagram showing arrangement in a plan view, of each image pick-up portion with respect to the vehicular main body similarly to FIG. 24. In the embodiment described so far, first image pick-up portion 51 and second image pick-up portion 52 are arranged on the left of work implement 4. First image pick-up portion 51 and second image pick-up portion 52 may be arranged on the right of work implement 4.

In the example where the stereo camera is arranged on the right of work implement 4 shown in FIG. 25 as well, optical axis AX1 of first image pick-up portion 51 and optical axis AX2 of second image pick-up portion 52 are inclined toward the work implement with respect to central axis C of work implement 4 as a distance from the vehicular main body is greater. Optical axis AX1 of first image pick-up portion 51 and optical axis AX2 of second image pick-up portion 52 are inclined at angles different from each other with respect to central axis C of work implement 4. An angle of inclination of first image pick-up portion 51 with respect to central axis C of work implement 4 is greater than an angle of inclination of second image pick-up portion 52 with respect to central axis C of work implement 4.

Figure 26:
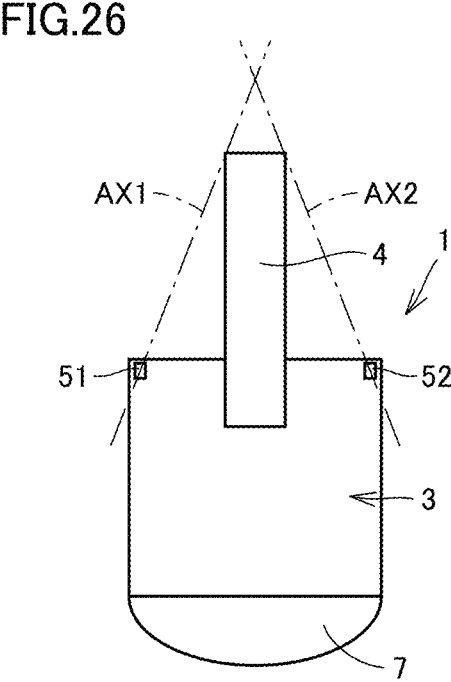
FIG. 26 is a schematic diagram showing arrangement in a plan view, of each image pick-up portion with respect to the vehicular main body.

FIG. 26 is a schematic diagram showing arrangement in a plan view, of each image pick-up portion with respect to the vehicular main body similarly to FIGS. 24 and 25. In the embodiment described so far, both of first image pick-up portion 51 and second image pick-up portion 52 are arranged in any one of the left side and the right side of work implement 4. First image pick-up portion 51 and second image pick-up portion 52 may be arranged separately on the left side of work implement 4 and the right side of work implement 4.

In the example where first image pick-up portion 51 is arranged on the left side of work implement 4 and second image pick-up portion 52 is arranged on the right side of work implement 4 shown in FIG. 26 as well, optical axis AX1 of first image pick-up portion 51 and optical axis AX2 of second image pick-up portion 52 are inclined toward the work implement with respect to central axis C of work implement 4 as a distance from the vehicular main body is greater.

A function and effect of the present embodiment will now be described.

Hydraulic excavator 1 representing one example of the work vehicle in the present embodiment includes the vehicular main body constituted of travel unit 2 and revolving unit 3 and work implement 4 attached to revolving unit 3 as shown in FIG. 1. As shown in FIG. 12, work implement 4 has central axis C in the plan view. As shown in FIG. 5, hydraulic excavator 1 includes first stereo camera 50. First stereo camera 50 is attached to revolving unit 3. As shown in FIG. 5, first stereo camera 50 has first image pick-up portion 51 and second image pick-up portion 52.

As shown in FIG. 12, optical axis AX1 of first image pick-up portion 51 and optical axis AX2 of second image pick-up portion 52 are inclined toward work implement 4 with respect to central axis C of work implement 4 in the plan view as a distance from the vehicular main body is greater. Optical axis AX1 of first image pick-up portion 51 and optical axis AX2 of second image pick-up portion 52 are inclined at angles different from each other with respect to central axis C of work implement 4. Optical axis AX1 of first image pick-up portion 51 and optical axis AX2 of second image pick-up portion 52 are inclined with respect to central axis C of work implement 4 in the direction intersecting with central axis C of work implement 4 in front of the vehicular main body.

In order to improve accuracy of image pick-up data resulting from image pick-up by a stereo camera, based on principles of triangulation, an interval between two image pick-up portions constituting the stereo camera is desirably greater. In the present embodiment, first image pick-up portion 51 and second image pick-up portion 52 are arranged at a distance from each other in the lateral direction of the vehicular main body and hence accuracy of image pick-up data resulting from image pick-up by first stereo camera 50 is improved. Furthermore, in the present embodiment, first image pick-up portion 51 and second image pick-up portion 52 are inclined at angles different from each other toward work implement 4 with respect to central axis C of work implement 4 as a distance from the vehicular main body is greater. Thus, when an interval between first image pick-up portion 51 and second image pick-up portion 52 is increased as well, images of the same object can simultaneously be picked up by first image pick-up portion 51 and second image pick-up portion 52. Therefore, an image of existing topography to be worked can accurately be picked up and productivity in executing operations in a construction project can be improved.

As shown in FIG. 12, first image pick-up portion 51 is arranged at a position more distant from work implement 4 than second image pick-up portion 52 in the lateral direction of the vehicular main body. An angle of inclination of optical axis AX1 of first image pick-up portion 51 with respect to central axis C of work implement 4 is greater than an angle of inclination of optical axis AX2 of second image pick-up portion 52 with respect to central axis C of work implement 4. Thus, first image pick-up portion 51 and second image pick-up portion 52 can simultaneously pick up images of a region in front of work implement 4. Therefore, an image of existing topography to be worked such as existing topography to be worked by work implement 4 of hydraulic excavator 1 can accurately be picked up.

As shown in FIGS. 16 and 17, first stereo camera 50 is configured to be able to pick up a vertically long image. An image pick-up element of first image pick-up portion 51 and an image pick-up element of second image pick-up portion 52 each have a rectangular light reception surface. The light reception surface has a long side relatively long in length and a short side relatively short in length and is arranged such that the long side extends along the vertical direction. Thus, first stereo camera 50 capable of picking up a vertically long image can be implemented.

By configuring first stereo camera 50 to be able to pick up a vertically long image, images over a wider range in the upward/downward direction or the fore/aft direction can simultaneously be picked up with first stereo camera 50. Therefore, an image over a wide range of existing topography to be worked can accurately be picked up.

As shown in FIG. 5, hydraulic excavator 1 further includes second stereo camera 60. Second stereo camera 60 is attached to revolving unit 3. As shown in FIG. 5, second stereo camera 60 has third image pick-up portion 61 and fourth image pick-up portion 62.

As shown in FIG. 12, optical axis AX3 of third image pick-up portion 61 and optical axis AX4 of fourth image pick-up portion 62 are inclined toward work implement 4 with respect to central axis C of work implement 4 in the plan view as a distance from the vehicular main body is greater. Optical axis AX3 of third image pick-up portion 61 and optical axis AX4 of fourth image pick-up portion 62 are inclined at angles different from each other with respect to central axis C of work implement 4. Optical axis AX3 of third image pick-up portion 61 and optical axis AX4 of fourth image pick-up portion 62 are inclined with respect to central axis C of work implement 4 in the direction intersecting with central axis C of work implement 4 in front of the vehicular main body.

In the present embodiment, third image pick-up portion 61 and fourth image pick-up portion 62 are arranged at a distance from each other in the lateral direction of the vehicular main body and hence accuracy of image pick-up data resulting from image pick-up by second stereo camera 60 is improved. Furthermore, in the present embodiment, third image pick-up portion 61 and fourth image pick-up portion 62 are inclined at angles different from each other toward work implement 4 with respect to central axis C of work implement 4 as a distance from the vehicular main body is greater. Thus, when an interval between third image pick-up portion 61 and fourth image pick-up portion 62 is increased as well, images of the same object can simultaneously be picked up by third image pick-up portion 61 and fourth image pick-up portion 62. Therefore, an image of existing topography to be worked can accurately be picked up and productivity in executing operations in a construction project can be improved.

As shown in FIGS. 10 and 11, first stereo camera 50 picks up an image of image pick-up range R1. Second stereo camera 60 picks up an image of image pick-up range R2. As shown in FIG. 10, range R2 of image pick-up by second stereo camera 60 is located above range R1 of image pick-up by first stereo camera 50. Alternatively, as shown in FIG. 11, range R2 of image pick-up by second stereo camera 60 is located beyond range R1 of image pick-up by first stereo camera 50.

By setting ranges R1 and R2 of image pick-up by two stereo cameras such that image pick-up range R2 is located above or beyond image pick-up range R1, images over a wider range in the upward/downward direction or the fore/aft direction can simultaneously be picked up with two stereo cameras. Therefore, an image over a wide range of existing topography to be worked can accurately be picked up.

As shown in FIGS. 9 to 11, optical axis AX3 of third image pick-up portion 61 and optical axis AX4 of fourth image pick-up portion 62 of second stereo camera 60 form a downward angle from the horizontal direction in front of the vehicular main body. Second stereo camera 60 picking up an image of image pick-up range R2 above or beyond range R1 of image pick-up by first stereo camera 50 is arranged such that optical axes AX3 and AX4 form an angle of depression.

Since ground is an object to be worked in a construction project, by disposing second stereo camera 60 such that optical axis AX3 of third image pick-up portion 61 and optical axis AX4 of fourth image pick-up portion 62 form an angle of depression, topography to be worked is reliably included in range R2 of image pick-up by second stereo camera 60. Therefore, an image over a wider range of existing topography to be worked in the upward/downward direction or the fore/aft direction can accurately be picked up with two stereo cameras.

As shown in FIGS. 16 and 17, second stereo camera 60 is configured to be able to pick up a vertically long image.

An image pick-up element of third image pick-up portion 61 and an image pick-up element of fourth image pick-up portion 62 each have a rectangular light reception surface. The light reception surface has a long side relatively long in length and a short side relatively short in length and is arranged such that the long side extends along the vertical direction. Thus, second stereo camera 60 capable of picking up a vertically long image can be implemented.

By configuring second stereo camera 60 to be able to pick up a vertically long image, images over a wider range in the upward/downward direction or the fore/aft direction can simultaneously be picked up with two stereo cameras. Therefore, an image over a wide range of existing topography to be worked can accurately be picked up.

As shown in FIGS. 5, 10, and 11, first image pick-up portion 51, second image pick-up portion 52, third image pick-up portion 61, and fourth image pick-up portion 62 are arranged at the same positions in the upward/downward direction.

When first stereo camera 50 and second stereo camera 60 are arranged in cab 5, arrangement of first stereo camera 50 and second stereo camera 60 as being aligned in the upward/downward direction may lead to cut-off by the stereo cameras of a field of view of an operator who gets on cab 5. By arranging the image pick-up portions of first stereo camera 50 and second stereo camera 60 at the same positions in the upward/downward direction and arranging the image pick-up portions as being aligned in the lateral direction in cab 5, a wide field of view of the operator can be ensured and hence efficiency in work by the operator can be improved.

As shown in FIG. 1, hydraulic excavator 1 further includes cab 5. Cab 5 is arranged on revolving unit 3. First image pick-up portion 51 and second image pick-up portion 52 are arranged in cab 5. Third image pick-up portion 61 and fourth image pick-up portion 62 are arranged in cab 5. By arranging each image pick-up portion in cab 5, an image of existing topography to be worked viewed from a position closer to a point of view of the operator who gets on cab 5 can be picked up and hence an image of existing topography to be worked can accurately be picked up. Additionally, the image pick-up portion can be protected against vibration, a flying object, or interference with work implement 4 which occurs during work by hydraulic excavator 1.

Hydraulic excavator 1 representing one example of the work vehicle in the present embodiment has the vehicular main body constituted of travel unit 2 and revolving unit 3 as shown in FIG. 1. Hydraulic excavator 1 is provided with an image pick-up apparatus. As shown in FIG. 5, the image pick-up apparatus includes first stereo camera 50 and second stereo camera 60. First stereo camera 50 and second stereo camera 60 are attached to revolving unit 3.

As shown in FIGS. 10 and 11, first stereo camera 50 picks up an image of image pick-up range R1. Second stereo camera 60 picks up an image of image pick-up range R2. As shown in FIG. 10, range R2 of image pick-up by second stereo camera 60 is located above range R1 of image pick-up by first stereo camera 50. Alternatively, as shown in FIG. 11, range R2 of image pick-up by second stereo camera 60 is located beyond range R1 of image pick-up by first stereo camera 50.

By setting ranges R1 and R2 of image pick-up by two stereo cameras such that image pick-up range R2 is located above or beyond image pick-up range R1, images over a wider range in the upward/downward direction or the fore/aft direction can simultaneously be picked up with two stereo cameras. Therefore, when an object to be worked includes slope T1, an image of existing topography over a wide range in the upward/downward direction can accurately be picked up. Alternatively, when flat ground is an object to be worked, an image of existing topography over a wide range in the fore/aft direction can accurately be picked up.

As image pick-up portions of two stereo cameras pick up images of image pick-up ranges R1 and R2 all in synchronization at the same time, highly accurate data on existing topography over a wide region can be obtained.

As shown in FIGS. 10, 11, and 16, range R1 of image pick-up by first stereo camera 50 overlaps with range R2 of image pick-up by second stereo camera 60. By disposing two stereo cameras such that the upper edge portion of image pick-up range R1 overlaps the lower edge portion of image pick-up range R2, images over a wider range in the upward/downward direction or the fore/aft direction can simultaneously be picked up with two stereo cameras.

As shown in FIG. 1, hydraulic excavator 1 further has work implement 4 attached to revolving unit 3. As shown in FIG. 12, work implement 4 has central axis C in the plan view. The optical axis of first stereo camera 50 in the plan view is defined by optical axis AX1 of first image pick-up portion 51 and optical axis AX2 of second image pick-up portion 52 shown in FIG. 12. The optical axis of second stereo camera 60 in the plan view is defined by optical axis AX3 of third image pick-up portion 61 and optical axis AX4 of fourth image pick-up portion 62 shown in FIG. 12.

The optical axis of first stereo camera 50 and the optical axis of second stereo camera 60 are inclined toward work implement 4 with respect to central axis C of work implement 4 in the plan view as a distance from the vehicular main body is greater. The optical axis of first stereo camera 50 and the optical axis of second stereo camera 60 are inclined at angles different from each other with respect to central axis C of work implement 4. The optical axis of first stereo camera 50 and the optical axis of second stereo camera 60 are inclined with respect to central axis C of work implement 4 in the direction intersecting with central axis C of work implement 4 in front of the vehicular main body.

Thus, images of the same object can simultaneously be picked up by first stereo camera 50 and second stereo camera 60. Therefore, an image of existing topography to be worked can accurately be picked up and productivity in executing operations in a construction project can be improved.

As shown in FIGS. 8 and 9, the optical axis of first stereo camera 50 and the optical axis of second stereo camera 60 form a downward angle from the horizontal direction, in front of the vehicular main body. First stereo camera 50 and second stereo camera 60 are arranged such that the optical axes thereof each form an angle of depression.

Since ground is worked in a construction project, by disposing first stereo camera 50 and second stereo camera 60 such that an optical axis of each of them forms an angle of depression, ground to be worked is reliably included in range R1 of image pick-up by first stereo camera 50 and range R2 of image pick-up by second stereo camera 60. Therefore, an image over a wider range of existing topography to be worked can accurately be picked up with two stereo cameras.

As shown in FIG. 5, first stereo camera 50 and second stereo camera 60 are arranged as being aligned in the lateral direction of the vehicular main body.

When first stereo camera 50 and second stereo camera 60 are arranged in cab 5, arrangement of first stereo camera 50 and second stereo camera 60 as being aligned in the upward/downward direction may lead to cut-off by the stereo cameras of a field of view of an operator who gets on cab 5. By arranging first stereo camera 50 and second stereo camera 60 as being aligned in the lateral direction in cab 5, a wide field of view of the operator can be ensured and hence efficiency in work by the operator can be improved.

As shown in FIG. 5, first stereo camera 50 and second stereo camera 60 are arranged at the same positions in the upward/downward direction. By arranging first stereo camera 50 and second stereo camera 60 at the same positions in the upward/downward direction, a wide field of view of an operator can be ensured and hence efficiency in work by the operator can be improved.

As shown in FIG. 5, first stereo camera 50 has first image pick-up portion 51 and second image pick-up portion 52. Second image pick-up portion 52 is arranged on the right of first image pick-up portion 51 in the lateral direction of the vehicular main body. Second stereo camera 60 has third image pick-up portion 61 and fourth image pick-up portion 62. Fourth image pick-up portion 62 is arranged on the right of third image pick-up portion 61 in the lateral direction of the vehicular main body. First image pick-up portion 51 and third image pick-up portion 61 constitute the left image pick-up portion group. Second image pick-up portion 52 and fourth image pick-up portion 62 constitute the right image pick-up portion group. As shown in FIG. 5, the left image pick-up portion group and the right image pick-up portion group are arranged at a distance from each other in the lateral direction of the vehicular main body.

In order to improve accuracy of image pick-up data resulting from image pick-up by a stereo camera, based on principles of triangulation, an interval between two image pick-up portions constituting the stereo camera is desirably greater. In the present embodiment, the left image pick-up portion group and the right image pick-up portion group are arranged at a distance from each other in the lateral direction of the vehicular main body. Therefore, accuracy of image pick-up data resulting from image pick-up by first stereo camera 50 and second stereo camera 60 can be improved.

As shown in FIGS. 16 and 17, first stereo camera 50 and second stereo camera 60 are configured to be able to pick up a vertically long image.

An image pick-up element of first image pick-up portion 51 and an image pick-up element of second image pick-up portion 52 each have a rectangular light reception surface. The light reception surface has a long side relatively long in length and a short side relatively short in length and is arranged such that the long side extends along the vertical direction. Thus, first stereo camera 50 capable of picking up a vertically long image can be implemented.

An image pick-up element of third image pick-up portion 61 and an image pick-up element of fourth image pick-up portion 62 each have a rectangular light reception surface. The light reception surface has a long side relatively long in length and a short side relatively short in length and is arranged such that the long side extends along the vertical direction. Thus, second stereo camera 60 capable of picking up a vertically long image can be implemented.

By configuring first stereo camera 50 and second stereo camera 60 to be able to pick up a vertically long image, images over a wider range in the upward/downward direction or the fore/aft direction can simultaneously be picked up with two stereo cameras. Therefore, an image over a wide range of existing topography to be worked can accurately be picked up.

As shown in FIG. 1, the vehicular main body has cab 5. As shown in FIG. 5, the image pick-up apparatus is attached to cab 5. By attaching the image pick-up apparatus to cab 5, an image of existing topography to be worked viewed from a position closer to a point of view of the operator who gets on cab 5 can be picked up and hence an image of existing topography to be worked can accurately be picked up.

As shown in FIG. 1, hydraulic excavator 1 representing one example of the work vehicle in the present embodiment has the vehicular main body constituted of travel unit 2 and revolving unit 3. Hydraulic excavator 1 is provided with an image pick-up apparatus. As shown in FIG. 5, the image pick-up apparatus includes first stereo camera 50 and second stereo camera 60. First stereo camera 50 and second stereo camera 60 are attached to revolving unit 3.

As shown in FIG. 5, first stereo camera 50 has first image pick-up portion 51 and second image pick-up portion 52. Second image pick-up portion 52 is arranged on the right of first image pick-up portion 51 in the lateral direction of the vehicular main body. Second stereo camera 60 has third image pick-up portion 61 and fourth image pick-up portion 62. Fourth image pick-up portion 62 is arranged on the right of third image pick-up portion 61 in the lateral direction of the vehicular main body. First image pick-up portion 51' and third image pick-up portion 61 constitute the left image pick-up portion group. Second image pick-up portion 52 and fourth image pick-up portion 62 constitute the right image pick-up portion group. As shown in FIG. 5, the left image pick-up portion group and the right image pick-up portion group are arranged at a distance from each other in the lateral direction of the vehicular main body.

In order to improve accuracy of image pick-up data resulting from image pick-up by a stereo camera, based on principles of triangulation, an interval between two image pick-up portions constituting the stereo camera is desirably greater. In the present embodiment, the left image pick-up portion group and the right image pick-up portion group are arranged at a distance from each other in the lateral direction of the vehicular main body. Therefore, accuracy of image pick-up data from first stereo camera 50 and second stereo camera 60 is improved. Therefore, an image of existing topography to be worked can accurately be picked up.

As shown in FIG. 5, first image pick-up portion 51, third image pick-up portion 61, second image pick-up portion 52, and fourth image pick-up portion 62 are arranged sequentially from the left to the right in the lateral direction of the vehicular main body. Thus, a difference between the interval in the lateral direction between first image pick-up portion 51 and second image pick-up portion 52 and the interval in the lateral direction between third image pick-up portion 61 and fourth image pick-up portion 62 can be made smaller. Typically, the interval in the lateral direction between first image pick-up portion 51 and second image pick-up portion 52 and the interval in the lateral direction between third image pick-up portion 61 and fourth image pick-up portion 62 can be equal to each other. Thus, accuracy of image pick-up data from first stereo camera 50 can be equivalent to accuracy of image pick-up data from second stereo camera 60.

As shown in FIG. 5, the interval between third image pick-up portion 61 and second image pick-up portion 52 in the lateral direction of the vehicular main body is greater than the interval between first image pick-up portion 51 and third image pick-up portion 61 in the lateral direction and greater than the interval between second image pick-up portion 52 and fourth image pick-up portion 62 in the lateral direction.

Thus, first image pick-up portion 51 and second image pick-up portion 52 can reliably be arranged at a great distance from each other in the lateral direction of the vehicular main body and third image pick-up portion 61 and fourth image pick-up portion 62 can reliably be arranged at a great distance from each other in the lateral direction of the vehicular main body. Therefore, accuracy of image pick-up data from first stereo camera 50 and second stereo camera 60 is improved. Therefore, an image of existing topography to be worked can accurately be picked up.

As shown in FIG. 1, hydraulic excavator 1 further has cab 5. Cab 5 has a pair of front pillars 40. Front pillar 40 has right pillar 41 and left pillar 42. As shown in FIG. 5, the left image pick-up portion group is arranged as being closer to left pillar 42 than to the center of cab 5 in the lateral direction of the vehicular main body. The right image pick-up portion group is arranged as being closer to right pillar 41 than to the center of cab 5 in the lateral direction of the vehicular main body.

By doing so, the left image pick-up portion group and the right image pick-up portion group can reliably be arranged at a great distance from each other in the lateral direction of the vehicular main body. Therefore, accuracy of image pick-up data from first stereo camera 50 and second stereo camera 60 is improved. Therefore, an image of existing topography to be worked can accurately be picked up. Since operator's seat 8 where an operator is seated is arranged substantially in the central portion in cab 5, interference by the image pick-up portion of a field of view of the operator can be suppressed by arranging each image pick-up portion as being closer to front pillar 40 and thus a wide field of view of the operator can be ensured.

As shown in FIG. 1, cab 5 has front window 47. As shown in FIG. 5, first stereo camera 50 and second stereo camera 60 are arranged along the upper edge of front window 47 in cab 5.

By arranging first stereo camera 50 and second stereo camera 60 in cab 5, an image of existing topography to be worked viewed from a position closer to a point of view of the operator who gets on cab 5 can be picked up and hence an image of existing topography to be worked can accurately be picked up. Additionally, first stereo camera 50 and second stereo camera 60 can be protected against vibration, a flying object, or interference with work implement 4 which occurs during work by hydraulic excavator 1.

When first stereo camera 50 and second stereo camera 60 are arranged in cab 5, the arrangement should be such that a field of view of an operator who gets on cab 5 is not cut off by the stereo cameras. By arranging the image pick-up portions of first stereo camera 50 and second stereo camera 60 as being aligned in the lateral direction along the upper edge of front window 47, a wide field of view of the operator can be ensured and efficiency in work by the operator can be improved.

Front window 47 shown in FIG. 5 is constructed to be immobile. When the stereo camera is arranged along the upper edge of front window 47 and front window 47 is opened and closed, a structure in cab 5 may interfere with the stereo camera and each image pick-up portion of the stereo camera may collide with the structure in cab 5. By constructing front window 47 to be immobile, collision of each image pick-up portion of the stereo camera with the structure in cab 5 can be avoided. Therefore, unexpected displacement of the image pick-up portion can be prevented and the image pick-up portion can be protected.

Front window 47 being immobile is a concept encompassing both of an example in which front window 47 is completely fixed to cab 5 and an example in which although front window 47 is movable with respect to cab 5, a feature for moving front window 47 does not function and consequently front window 47 cannot move.

A method of generating image data in the present embodiment is a method of generating image data for a work vehicle represented by hydraulic excavator 1. As shown in FIG. 1, hydraulic excavator 1 has work implement 4. Hydraulic excavator 1 has an image pick-up apparatus. The image pick-up apparatus picks up an image of a work region where work implement 4 performs work. As shown in FIG. 18, the method of generating image data includes moving work implement 4 out of an angle of view of the image pick-up apparatus (step S1), picking up an image of the work region with the image pick-up apparatus with work implement 4 having been moved out of the angle of view of the image pick-up apparatus (step S2), and generating image data on the work region of which image has been picked up (step S3).

When work implement 4 is present in the angle of view of the image pick-up apparatus, work implement 4 hides a part of existing topography of the work region and hence it is difficult to accurately know existing topography. By including moving work implement 4 out of the angle of view of the image pick-up apparatus (step S1) prior to image pick-up, work implement 4 is no longer present in the angle of view of the image pick-up apparatus at the time of image pick-up. Since work implement 4 is thus not included in image pick-up by the image pick-up apparatus, highly accurate image pick-up of existing topography in the work region can be achieved. Therefore, image data of the work region can more highly accurately be generated.

As shown in FIG. 5, the image pick-up apparatus has first stereo camera 50. First stereo camera 50 includes first image pick-up portion 51 and second image pick-up portion 52. According to such a construction, an image of the work region can accurately be picked up with first image pick-up portion 51 and second image pick-up portion 52.

As shown in FIG. 5, the image pick-up apparatus has second stereo camera 60. Second stereo camera 60 includes third image pick-up portion 61 and fourth image pick-up portion 62. As shown in FIGS. 10 and 11, first stereo camera 60 picks up an image of image pick-up range R1. Second stereo camera 60 picks up an image of image pick-up range R2. As shown in FIG. 10, range R2 of image pick-up by second stereo camera 60 is located above range R1 of image pick-up by first stereo camera 50. Alternatively, as shown in FIG. 11, range R2 of image pick-up by second stereo camera 60 is located beyond range R1 of image pick-up by first stereo camera 50.

By setting ranges R1 and R2 of image pick-up by two stereo cameras such that image pick-up range R2 is located above or beyond image pick-up range R1, images over a wider range in the upward/downward direction or the fore/aft direction can simultaneously be picked up with two stereo cameras. Therefore, when an object to be worked includes slope T1, an image over a wide range of existing topography in the upward/downward direction can accurately be picked up. Alternatively, when flat ground is an object to be worked, an image over a wide range of existing topography in the fore/aft direction can accurately be picked up.

As shown in FIG. 14, generated image data on the work region includes topography data T representing a three-dimensional shape of the work region. By subjecting two two-dimensional images resulting from image pick-up of the work region from different angles by first stereo camera 50 and second stereo camera 60 to stereo matching processing, existing topography over a wide range of the work region can three-dimensionally be recognized.

As shown in FIGS. 16 and 17, first image pick-up portion 51, second image pick-up portion 52, third image pick-up portion 61, and fourth image pick-up portion 62 pick up images of the work region in synchronization. As image pick-up portions of two stereo cameras pick up images of image pick-up ranges R1 and R2 all in synchronization at the same time, highly accurate data on existing topography over a wide region can be obtained.

As shown in FIGS. 16 and 17, first stereo camera 50 and second stereo camera 60 are configured to be able to pick up a vertically long image.

An image pick-up element of first image pick-up portion 51 and an image pick-up element of second image pick-up portion 52 each have a rectangular light reception surface. The light reception surface has a long side relatively long in length and a short side relatively short in length and is arranged such that the long side extends along the vertical direction. Thus, first stereo camera 50 capable of picking up a vertically long image can be implemented.

An image pick-up element of third image pick-up portion 61 and an image pick-up element of fourth image pick-up portion 62 each have a rectangular light reception surface. The light reception surface has a long side relatively long in length and a short side relatively short in length and is arranged such that the long side extends along the vertical direction. Thus, second stereo camera 60 capable of picking up a vertically long image can be implemented.

By configuring first stereo camera 50 and second stereo camera 60 to be able to pick up a vertically long image, images over a wider range in the upward/downward direction or the fore/aft direction can simultaneously be picked up with two stereo cameras. Therefore, an image over a wide range of existing topography to be worked can accurately be picked up.

As shown in FIG. 18, the method of generating image data further includes synthesizing image data generated through image pick-up by first stereo camera 50 and image data generated through image pick-up by second stereo camera 60 with each other in a longitudinal direction of each image data (step S4). By doing so, image data over a wider range associated with existing topography in the work region can highly accurately be generated through image pick-up by two stereo cameras.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 hydraulic excavator; 2 travel unit; 3 revolving unit; 4 work implement; 5 cab; 8 operator's seat; 20 controller; 21 monitor; 40 front pillar; 41 right pillar; 42 left pillar; 47 front window; 47*a* upper frame portion; 47*s* seat; 50 first stereo camera; 51 first image pick-up portion; 52 second image pick-up portion; 60 second stereo camera; 61 third image pick-up portion; 62 fourth image pick-up portion; 76 supervisory station; 81 left case; 82 right case; 90 base portion; 91 attachment angle bar; 92 attachment piece; 93 attachment plate; 95, 96, 97 bolt; 101, 111 bracket; 102, 112 fixed portion; 103, 104, 113, 114 projection portion; 761, 762 stereo matching portion; 763 upper-and-lower stereo image data synthesis portion; AX1, AX2, AX3, AX4 optical axis; C central axis; D1, D2 parallax image; I1, I2, I3, I4 obtained image; R1, R2 image pick-up range; T topography data; T1 slope; T2 top of slope; T3 toe of slope; T4 upper ground; T5 lower ground; and T6 plane.

The invention claimed is:

1. An image pick-up apparatus provided in a work vehicle, the work vehicle having a vehicular main body and a cab attached to the vehicle main body, the image pick-up apparatus comprising:
 a first stereo camera attached to the cab, the first stereo camera including a first image pick-up portion and a second image pick-up portion, and the first stereo camera picking up an image of a first image pick-up range in front of the work vehicle; and a second stereo camera attached to the cab, the second stereo camera including a third image pick-up portion and a fourth image pick-up portion, and the second stereo camera picking up an image of a second image pick-up range in front of the work vehicle and above the first image pick-up range,
 wherein an upper edge portion of the first image pick-up range and a lower edge portion of the second image pick-up range overlap with each other,
 wherein the first image pick-up portion of the first stereo camera is adjacent to the third image pick-up portion of the second stereo camera, and the second image pick-up portion of the first stereo camera is adjacent to the fourth image pick-up portion of the second stereo camera,
 wherein the work vehicle further has a work implement attached to the vehicular main body,
 wherein the work implement has a central axis in a plan view,
 wherein an optical axis of the first stereo camera and an optical axis of the second stereo camera are inclined with respect to the central axis of the work implement in the plan view toward the work implement,
 wherein the optical axis of the first stereo camera is more inclined towards the work implement with respect to the central axis in the plan view than the optical axis of the second stereo camera, and
 wherein the optical axis of the first stereo camera and the optical axis of the second stereo camera in the plan view intersect with the central axis of the work implement in front of the vehicular main body.

2. The image pick-up apparatus according to claim 1, wherein the optical axis of the first stereo camera and the optical axis of the second stereo camera form a downward angle from a horizontal direction, in front of the vehicular main body.

3. The image pick-up apparatus according to claim 1, wherein the first stereo camera and the second stereo camera are arranged as being aligned in a lateral direction of the vehicular main body.

4. The image pick-up apparatus according to claim 3, wherein the first stereo camera is arranged as high as the second stereo camera in an upward/downward direction.

5. The image pick-up apparatus according to claim 1, wherein
 the second image pick-up portion is arranged on a right side of the first image pick-up portion in a lateral direction of the vehicular main body,
 the fourth image pick-up portion is arranged on a right side of the third image pick-up portion in the lateral direction of the vehicular main body,
 the first image pick-up portion and the third image pick-up portion constitute a left image pick-up portion group,
 the second image pick-up portion and the fourth image pick-up portion constitute a right image pick-up portion group, and
 the left image pick-up portion group and the right image pick-up portion group are arranged at a distance from each other in the lateral direction of the vehicular main body.

6. The image pick-up apparatus according to claim 1, wherein the first stereo camera and the second stereo camera are configured to be able to pick up a vertically long image.

* * * * *